US009356765B2

United States Patent
Wang et al.

(10) Patent No.: US 9,356,765 B2
(45) Date of Patent: May 31, 2016

(54) COMMUNICATION METHOD FOR AGGREGATION OF HETEROGENEOUS COMPONENT CARRIERS AND COMMUNICATION DEVICE AND WIRELESS COMMUNICATION STATION USING THE SAME

(75) Inventors: Chun-Yen Wang, Tainan (TW); Chang-Lung Hsiao, Hsinchu County (TW); Ren-Jr Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 717 days.

(21) Appl. No.: 13/591,223

(22) Filed: Aug. 22, 2012

(65) Prior Publication Data

US 2013/0051264 A1 Feb. 28, 2013

Related U.S. Application Data

(60) Provisional application No. 61/526,691, filed on Aug. 24, 2011.

(51) Int. Cl.
*H04L 1/00* (2006.01)
*H04L 5/00* (2006.01)
(Continued)

(52) U.S. Cl.
CPC ........... *H04L 5/0098* (2013.01); *H04W 76/026* (2013.01); *H04W 88/06* (2013.01)

(58) Field of Classification Search
CPC ............ H04B 10/116; H04B 10/1149; H04W 88/085; H04W 92/20; H04W 88/06; H04L 5/0098
See application file for complete search history.

(56) References Cited

U.S. PATENT DOCUMENTS 7,688,680 B1 3/2010 Gunasekara et al.
8,279,876 B2 * 10/2012 Chang et al. ............. 370/395.52
(Continued)

FOREIGN PATENT DOCUMENTS

EP 2323304 5/2011
TW I295530 4/2008
(Continued)

OTHER PUBLICATIONS

"Office Action of Japan Counterpart Application", issued on Oct. 1, 2013, p. 1-p. 3, in which the listed references were cited.
(Continued)

*Primary Examiner* — Brian O'Connor
(74) *Attorney, Agent, or Firm* — Jianq Chyun IP Office

(57) ABSTRACT

Communication methods for aggregation of heterogeneous component carriers and communication devices and wireless communication stations using the same methods are proposed. In one embodiment, the proposed communication method is adapted to a wireless communication station and includes aggregating physical channel resources respectively corresponding to heterogeneous access technologies in a Layer 2 or below the Layer 2 in a protocol stack; and communicating with at least one wireless terminal communication device through the physical channel resources respectively corresponding to the heterogeneous access technologies, wherein the physical channel resources respectively corresponding to heterogeneous access technologies are heterogeneous component carriers. The physical channel resources may be heterogeneous component carriers, such as radio component carrier(s), optical component carrier(s), and/or acoustic component carrier(s).

41 Claims, 24 Drawing Sheets

(51) Int. Cl.
*H04W 76/02* (2009.01)
*H04W 88/06* (2009.01)

(56) References Cited

U.S. PATENT DOCUMENTS

| | | | |
|---|---|---|---|
| 8,374,129 B2* | 2/2013 | Lewis et al. | 370/328 |
| 8,380,081 B2* | 2/2013 | Kim et al. | 398/172 |
| 8,395,985 B2* | 3/2013 | Dinan | 370/206 |
| 8,396,368 B2* | 3/2013 | Tarlazzi et al. | 398/115 |
| 8,428,469 B2* | 4/2013 | Kim et al. | 398/172 |
| 8,462,610 B1* | 6/2013 | Dinan | 370/206 |
| 8,463,130 B2* | 6/2013 | Ma et al. | 398/115 |
| 8,792,376 B2* | 7/2014 | Jang et al. | 370/252 |
| 2007/0025738 A1* | 2/2007 | Moore | 398/189 |
| 2011/0038280 A1 | 2/2011 | Jung et al. | |
| 2011/0040888 A1 | 2/2011 | Krishnaswamy et al. | |
| 2011/0044218 A1* | 2/2011 | Kaur | H04W 76/026 370/310 |
| 2011/0170872 A1 | 7/2011 | Shin et al. | |
| 2012/0093517 A1* | 4/2012 | Rajagopal et al. | 398/130 |
| 2013/0286987 A1* | 10/2013 | Dinan | 370/329 |
| 2013/0315186 A1* | 11/2013 | Kim et al. | 370/329 |

FOREIGN PATENT DOCUMENTS

| | | |
|---|---|---|
| TW | 201114293 | 4/2011 |
| TW | 201126981 | 8/2011 |
| WO | 2010140347 | 12/2010 |
| WO | 2011022570 | 2/2011 |

OTHER PUBLICATIONS

Javaudin et al., "Inter-MAC Concept for Gigabit Home Networks," IEEE 20th International Symposium on Personal, Indoor and Mobile Radio Communications, Sep. 13-16, 2009, pp. 1-5.
Li et al., "Flexible Carrier Aggregation for Home Base Station in IMT-Advanced system," 5th International Conference on Wireless Communications, Networking and Mobile Computing, Sep. 24-26, 2009, pp. 1-4.
"Office Action of Korea Counterpart Application", issued on Jan. 20, 2014, p. 1-p. 12.
"Search Report of Europe Counterpart Application", issued on Dec. 13, 2012, p. 1-p. 8, in which the listed references were cited.
Mikio Iwamura, et al., "Carrier aggregation framework in 3GPP LTE-advanced [WiMAX/LTE Update]", IEEE Communications Magazine, IEEE Service Center, Piscataway, vol. 48, No. 8, Aug. 2010, pp. 60-67.
Jean-Philippe Javaudin, et al., "Technology convergence for future home networks", Wireless Days, 2008. WD '08. 1st IFIP, IEEE, Piscataway, Nov. 2008, pp. 1-5.
Klaus Ingemann Pedersen, et al., "Carrier aggregation for LTE-advanced: functionality and performance aspects", IEEE Communications Magazine, IEEE Service Center, Piscataway, vol. 49, No. 6, Jun. 2011, pp. 89-95.
3GPP, "LTE; Feasibility study for Further Advancements for E-UTRA (LTE-Advanced) (3GPP TR 36.912 version 10.0.0 Release 10)," Apr. 2011, pp. 1-6.
"Office Action of Taiwan Counterpart Application", issued on Mar. 17, 2015, p. 1-p. 12, in which the listed references were cited.

* cited by examiner

COMMUNICATION METHOD FOR AGGREGATION OF HETEROGENEOUS COMPONENT CARRIERS AND COMMUNICATION DEVICE AND WIRELESS COMMUNICATION STATION USING THE SAME

CROSS-REFERENCE TO RELATED APPLICATION

This application claims the priority benefits of U.S. provisional application Ser. No. 61/526,691,, filed on Aug. 24, 2011. The entirety of the above-mentioned patent applications is hereby incorporated by reference herein and made a part of this specification.

TECHNICAL FIELD

The disclosure generally relates to communication methods for aggregation of heterogeneous component carriers and communication devices and wireless communication stations using the same methods.

RELATED ART

In order to provide higher data rate transmissions and to support various applications, communication service providers are continually developing improvements to existing communication networks. Wider bandwidth allocation is a way to achieve the targets. So far, more and more techniques have been presented to achieve wireless communication, such as radio communication (e.g., UMTS, HSPA+, LTE, LTE-Advanced, WiMAX, WiFi, Zigbee, Bluetooth, etc.), light communication (e.g., Visible Light Communication (VLC)), sound communication (e.g., Sonar), infrared communications, and so forth. Therefore, it is important to integrate these heterogeneous communication technologies together so as to provide a wider bandwidth and/or to provide a higher data rate for mobile users.

SUMMARY

A communication method for aggregation of heterogeneous component carriers is introduced herein. According to an exemplary embodiment, the communication methods for aggregation of heterogeneous component carriers is adapted to a wireless communication station and includes following steps: aggregating physical channel resources respectively corresponding to heterogeneous access technologies in a Layer 2, or below the Layer 2, in a protocol stack; and communicating with at least one wireless terminal communication device through the physical channel resources respectively corresponding to the heterogeneous access technologies, wherein the physical channel resources respectively corresponding to heterogeneous access technologies are heterogeneous component carriers.

A wireless communication station is introduced herein. According to an exemplary embodiment, the wireless communication station includes at least one physical communication unit and a communication protocol unit. The at least one physical communication unit is configured for communicating with at least one wireless terminal communication device through at least one physical channel resource. The communication protocol unit is connected to the at least one physical communication unit, configured for aggregating the physical channel resources respectively corresponding to heterogeneous access technologies in a Layer 2, or below the Layer 2 in a protocol stack, wherein the physical channel resources respectively corresponding to the heterogeneous access technologies are heterogeneous component carriers.

A communication method for aggregation of heterogeneous component carriers is introduced herein. According to an exemplary embodiment, the communication method for aggregation of heterogeneous component carriers is adapted for a communication device, and includes following steps: aggregating physical channel resources respectively corresponding to heterogeneous access technologies in a Layer 2 or below the Layer 2, in a protocol stack; and communicating with at least one wireless communication station through the physical channel resources respectively corresponding to the heterogeneous access technologies.

A communication device is introduced herein. According to an exemplary embodiment, the communication device includes at least one physical communication unit and a communication protocol unit. The at least one physical communication unit is configured for communicating with at least one wireless communication station through at least one physical channel resource. The communication protocol unit is connected to the at least one physical communication unit, and configured for aggregating physical channel resources respectively corresponding to heterogeneous access technologies in a Layer 2, or below the Layer 2, in a protocol stack, wherein the physical channel resources respectively corresponding to heterogeneous access technologies are heterogeneous component carriers.

Several exemplary embodiments accompanied with figures are described in detail below to further describe the disclosure in details.

BRIEF DESCRIPTION OF DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION

Figure 1:
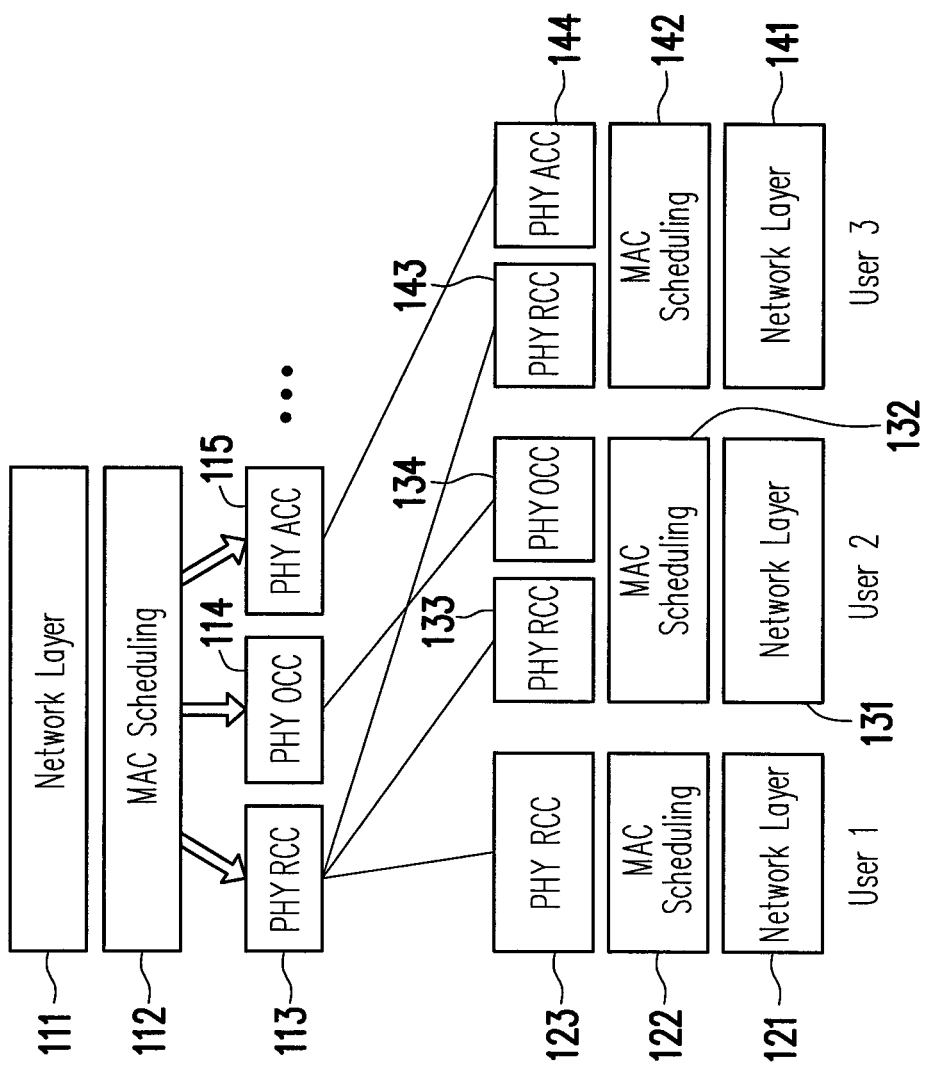
FIG. 1 is a schematic diagram illustrating communication methods involved with carrier aggregation with heterogeneous component carriers according to an embodiment of the disclosure.

Some embodiments of the present application will now be described more fully hereinafter with reference to the accompanying drawings, in which some, but not all embodiments of the application are shown. Indeed, various embodiments of the application may be embodied in many different forms and should not be construed as limited to the embodiments set forth herein; rather, these embodiments are provided so that this disclosure will satisfy applicable legal requirements. Like reference numerals refer to like elements throughout.

In the present disclosure, methods and apparatus to integrate heterogeneous wireless communication techniques are presented. In other words, communication methods for aggregation of heterogeneous component carriers are proposed along with wireless terminal communication devices, wireless remote head devices and wireless communication stations (e.g., bases station devices). More details can be found in the following sections. It can be shown that the proposed communication methods for aggregation of heterogeneous component carriers is rather simple than complex, and can still achieve expected performance in terms of providing wider bandwidth to the wireless terminal communication devices. It is noted that third generation project partnership (3GPP)-like technical terms are used to present major ideas in the present disclosure; however, the proposed communication methods for aggregation of heterogeneous component carriers in this disclosure could be applied to any other wireless communication systems (e.g., IEEE 802.11,, IEEE 802.16,, WiMAX and so forth.).

Throughout the disclosure, a user equipment (UE) could refer to a mobile station, an advanced mobile station, a wireless terminal communication device, an M2M device, a MTC device, and so fourth. The term "UE" in this disclosure may be, for example, a server, a client, a desktop computer, a laptop computer, a network computer, a workstation, a personal digital assistant (PDA), a tablet personal computer (PC), a scanner, a telephony device, a pager, a camera, a television, a hand-held video game device, a musical device, a media player device, a wireless sensor, and so forth. In some applications, a UE may be a fixed computing device operating in a mobile environment, such as a bus, a train, an airplane, a boat, a car, and so forth.

In the present disclosure, the term "eNodeB" may be, for example, a base station (BS), a Node-B, an eNode B, a base transceiver system (BTS), a remote head device, an access point, a home base station, a femto-cell base station, a relay station, a scatterer, a repeater, an intermediate node, an intermediary, and/or a satellite-based communication base station, and so forth.

In the present disclosure, the term "downlink" (DL) could refer to the RF signal transmission from a base station/a remote head device to a UE within the radio coverage of the base station; the term "uplink" (UL) could refer to the RF signal transmission from a UE to its access base station/remote head device.

Besides, in this disclosure, the term CC could be used to represent a component carrier. However, a CC could also be considered as a cell in some technical literature or technical specifications, where a CC may be operated on frequency division duplex (FDD) and/or time division duplex (TDD). A cell may have downlink resource to transmit signals from a BS to a UE, and/or may have uplink resource to transmit signals from a UE to a BS. For example, the term "Primary CC"(or "PCC") may be equivalent to the term "Primary Cell (Pcell)", and the term "Secondary CC" ("SCC") may be equivalent to the term "Secondary Cell (Scell)".

Multiple CCs may operate on the same frequency band or different frequency bands, and may have the same center frequency or different center frequencies. Multiple CCs may belong to the same eNodeB or different eNodeBs.

The proposed communication methods for aggregation of heterogeneous component carriers (which may be different communication technologies) can be operated in a wireless communication environment are disclosed. The wireless communication system of aggregation of heterogeneous carriers may include a communication network equipped with at least two heterogeneous component carriers, a UE equipped with communication modules (including physical layer and its corresponding MAC layer) to aggregate at least two heterogeneous component carriers, and means for aggregating heterogeneous component carriers in a Layer 2, or below the Layer 2.

3GPP Long term evolution (abbreviated as LTE hereinafter) system is used for only an example in the present disclosure. In a LTE-Advanced system, carrier aggregation (abbreviated as CA hereinafter) is used to aggregate two or more LTE component carriers (CCs) originating from the same eNB in order to provide a wider transmission bandwidth. With carrier aggregation technique, communication networks may be enabled to operate over continuous carriers or discontinuous carriers having different bandwidths. Also, a UE can simultaneously receive or transmit on one CC or multiple CCs depending on its capabilities. For example, in a wireless service coverage of an eNB, some UEs with reception and transmission capabilities for CA may simultaneously receive and transmit on multiple CCs; while some UEs may receive and transmit on a single CC only.

This disclosure presents a mechanism to achieve carrier aggregation with heterogeneous component carriers. FIG. 1 is a schematic diagram illustrating communication methods involved with carrier aggregation with heterogeneous component carriers according to an embodiment of the disclosure. As shown in FIG. 1, the upper half protocol stack refers to the protocol stack layer at a base station (or an eNodeB) side, the communication network (e.g., eNodeB) may be equipped with heterogeneous component carriers (CCs). For example, it may equipped with one or more radio component carriers (e.g., by using LTE carriers), one or more optical component carriers (e.g., by using visible light communication), and/or one or more acoustic component carriers, which may use sonar to achieve wireless communication. The present disclosure is not limited to radio component carriers, optical component carriers and acoustic component carriers, other communication technologies such as infrared component carriers can also be used in other embodiments.

Referring to FIG. 1, at the base station, in the physical layer, a radio component carrier (RCC) 113, an optical component carrier (OCC) 114 and an acoustic component carrier (ACC) 115 are aggregated in MAC layer (refers to MAC scheduling in FIG. 1) 112, and a network layer 111 is on top of the MAC layer 112.

Referring to FIG. 1, there are three users shown on the bottom half of FIG. 1. User 1 has only one RCC in the physical layer (referring to PHY RCC) 123, on top of the RCC 123 is a MAC layer 122, and on top of the MAC layer 122 is a network layer 121. The communication between the base station and the User 1 can be through the RCC 113 and RCC 123. On the other hand, User 2 has one RCC 133 and one OCC 134 in the physical layer, on top of the RCC 133 and the OCC 134 is a MAC layer 132, and the MAC layer 132 aggregates the RCC 133 and one OCC 134. On top of the MAC layer 132 is a network layer 131. The communication between the base station and the User 2 can be through the RCC 113 and RCC 133, and/or through the OCC 114 and OCC 134. Similarly, User 3 has one RCC 143 and one ACC 144 in the physical layer, on top of the RCC 143 and the ACC 144 is a MAC layer 142, and the MAC layer 142 aggregates the RCC 143 and one ACC 144. On top of the MAC layer 142 is a network layer 141. The communication between the base station and the User 3 can be through the RCC 113 and RCC 143, and/or through the ACC 115 and ACC 144.

The communication network may configure a UE to aggregate two or more CCs with heterogeneous communication media based on the UE capability. For example, the UE may provide its UE capability information to the communication network(s) to indicate the support of aggregation of heterogeneous component carriers. Based on the UE capability information, the communication network may determine to configure UE with two CCs. One is radio component carrier (RCC), and the other is optical component carrier (OCC). The UE may simultaneously receive and/or transmit through these heterogeneous CCs based on its capabilities.

Figure 2:
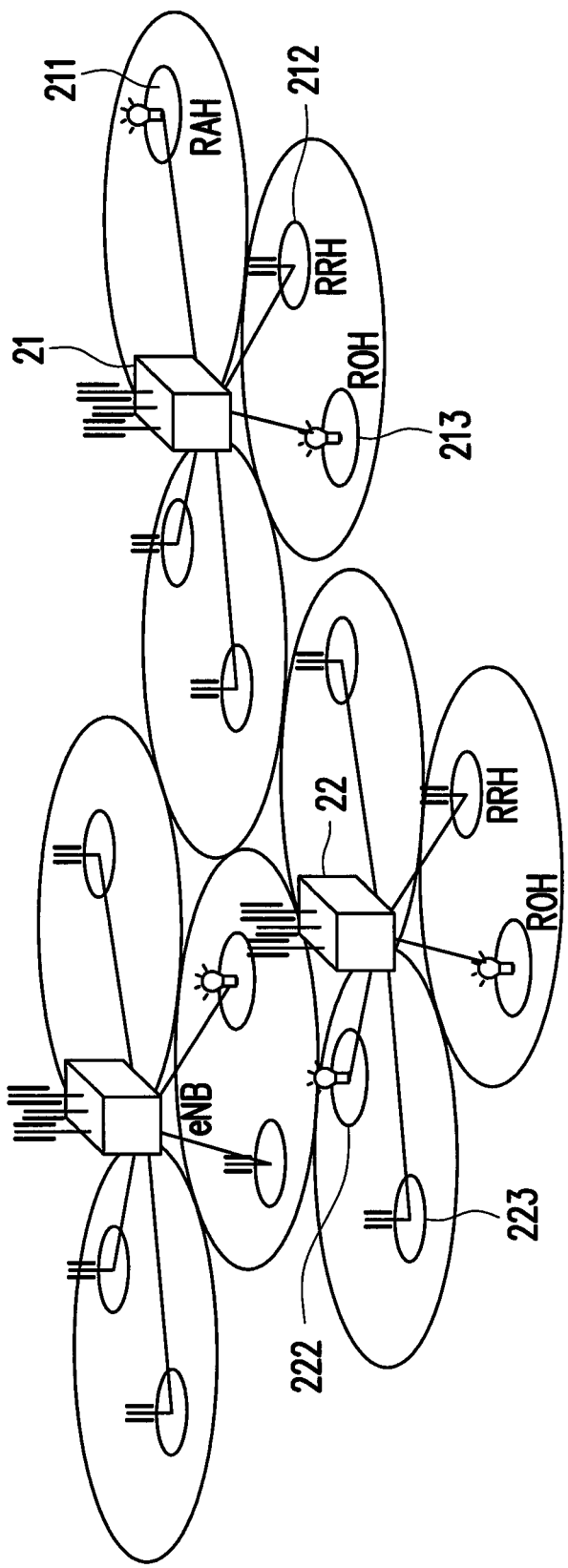
FIG. 2 is a schematic diagram illustrating a communication network utilizing aggregation of heterogeneous carrier components according to an embodiment of the disclosure.

FIG. 2 is a schematic diagram illustrating a communication network utilizing aggregation of heterogeneous carrier components according to an embodiment of the disclosure. Referring to FIG. 2, in a communication network 20, a base station 21 could be connected to remote head devices at the same cell site, such as ROH 213 and RRH 212 being deployed at the same cell site. The base station 21 could be connected to other remote head devices deployed in different physical location such as a RAH 211 being deployed in a different cell site than that of the ROH 213. Also, in the present embodiment, another station 22 is connected to remote head devices at the same cell site such as RAH 222 and RRH 223 being deployed at the same cell site. It is noted that the base station 21 or 22 could still have its corresponding RCC for communicating with UE(s) within its wireless service coverage.

Figure 3:
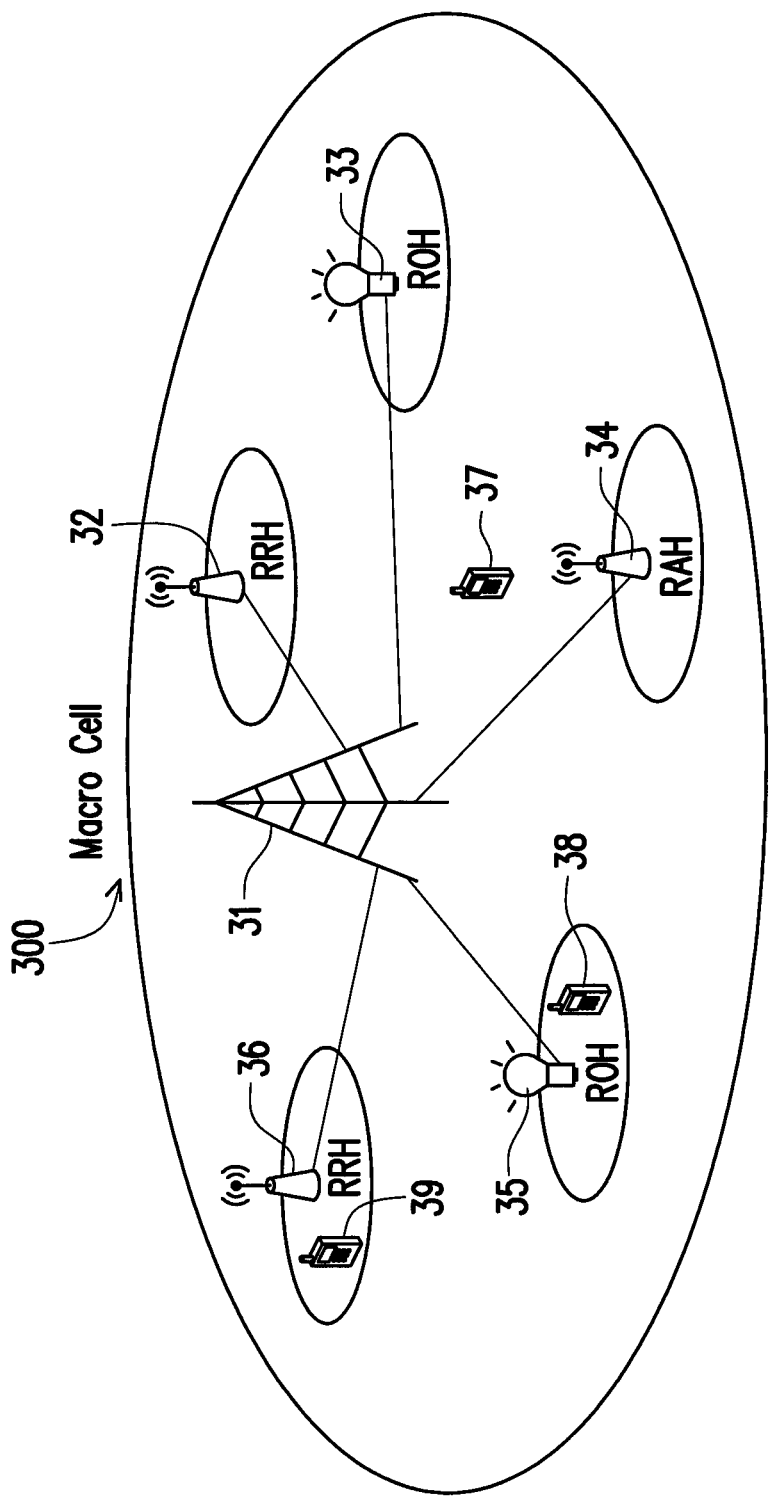
FIG. 3 is a schematic diagram illustrating a communication network utilizing aggregation of heterogeneous carrier components according to an embodiment of the disclosure.

FIG. 3 is a schematic diagram illustrating a communication network utilizing aggregation of heterogeneous carrier components according to an embodiment of the disclosure. Referring to FIG. 3, in a communication network, within a wireless coverage area (denoted as a macro cell 300) of a base station 31, there are deployed an RRH 32, an ROH 33, an RAH 34, an ROH 35 (also called a "Light cell") and an RRH 36. There are also some UEs 37, 38 and 39 within the macro cell 300. The base station 31 can connect to the RRH 32, the ROH 33, the RAH 34, the ROH 35 and the RRH 36. The UE 38 is within a wireless service coverage area of the ROH 35, and the UE 39 is within a radio service coverage area of the RRH 36.

In the present embodiment, one of the CCs configured by the communication network to the UE may be designated as a Primary CC (also called a PCC or a PCell), and the other CCs are secondary CC(s) (also called SCC(s) or SCell(s)). For example, the network may configure an "LTE Cell" (such as the macro cell 300) as a PCell, and configure a "Light Cell" (such as the ROH 35) as a SCell. In some embodiments, the PCell may provide the resource allocation information (e.g., PDCCH) for downlink (DL) assignment and/or uplink (UL) bandwidth grants (UL grants) for SCell. As such, the control channel overhead can be saved for the SCell(s).

In addition, the communication media used by SCC may only provide a unidirectional transmission (i.e., from the communication network to a UE or from a UE to a communication network). For example, in some embodiments, only downlink transmission is allowed in OCC. As for the hybrid automatic repeated request (HARQ) acknowledgement/ negative acknowledgement (ACK/NACK) feedbacks, the ACK/NACK feedbacks for SCell DL transmission can be sent through its corresponding PCell. For example, HARQ ACK/NACK feedbacks for DL transmission in an OCC may be sent by the UE through the RCC.

Figure 4:
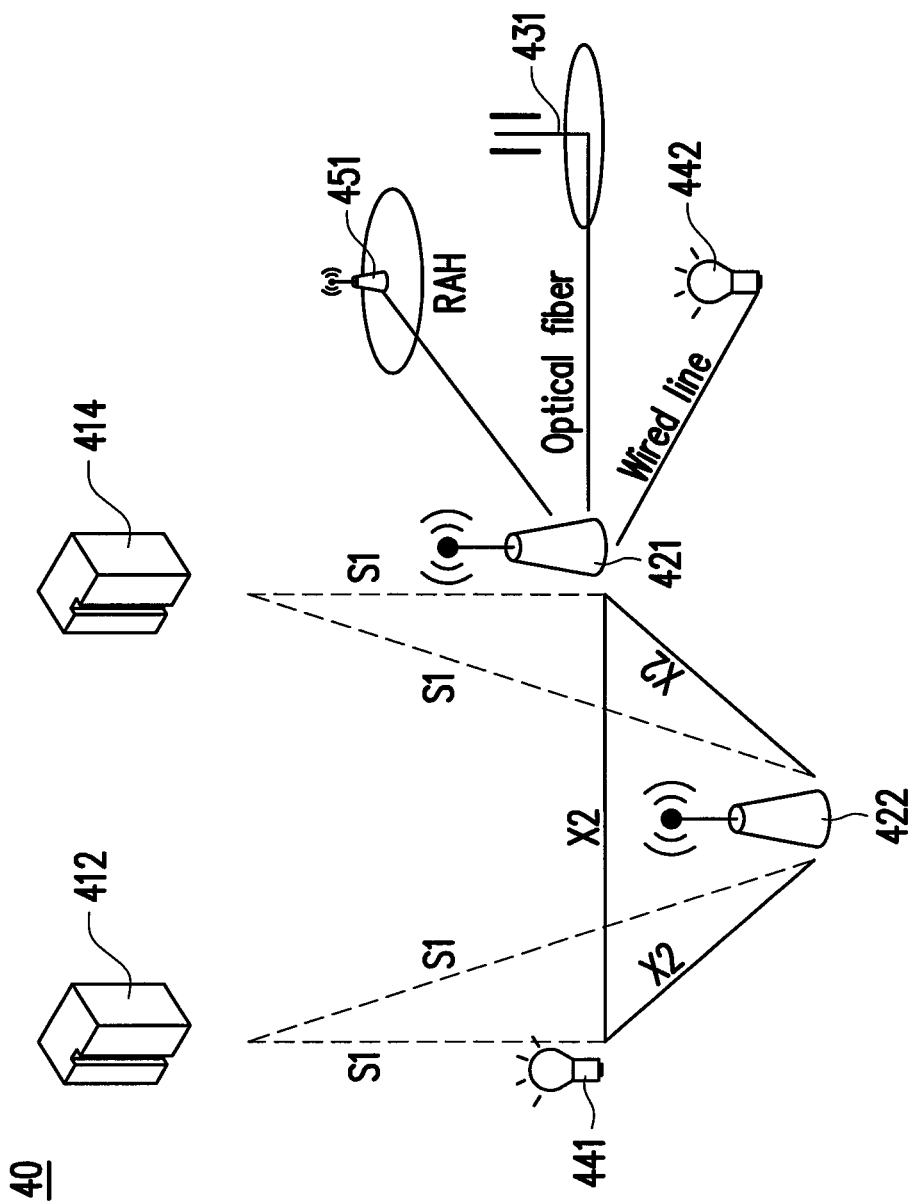
FIG. 4 illustrates a system architecture of a communication network utilizing aggregation of heterogeneous carrier components.

FIG. 4 illustrates a system architecture of a communication network utilizing aggregation of heterogeneous carrier components. Referring to FIG. 4, a communication network 40 includes at least a mobility management entity (MME)/serving gateway (S-GW) 412, a MME/S-GW 414, an eNodeB 421, an eNodeB 422, an RRH 431, an ROH 441, an ROH 442 and an RAH 451. UE is not shown in FIG. 4, but UE can access to the communication network 40 through CC(s) with the eNodeB 421, the eNodeB 422, the RRH 431, the ROH 441, the ROH 442 or the RAH 451.

In some embodiments, heterogeneous transmission points (e.g., the eNodeB 421, the RRH 431, the RAH 451, the ROH 441 and so forth) may be located at the same location or within the same device (e.g., equipped by the same eNodeB). For example, an eNodeB may have both ROH capability and RRH capability. In other embodiments, heterogeneous transmission points may be connected by wired lines (e.g., by an optical fiber, a power line, a coaxial cable and so forth) and/or be connected by using an X2 interface. In FIG. 4, the eNodeB 421, the eNodeB 422, the RRH 431, the ROH 441, the ROH 442 and the RAH 451 are connected with neighboring heterogeneous transmission points by using the X2, interface. In these cases, several wired-line communication protocols (e.g., ITU Ghn (ITU G9960), IEEE P1901,, HomePlug AV, MediaXtream, HPNA (ITU G9954)) may be applied. Further, heterogeneous transmission points (e.g., the eNodeB 421, the eNodeB 422 or the ROH 441) may communicate with gateways (e.g., the MME/S-GW 412, 414) by using an Si interface. That is, the eNodeB 421 and the eNodeB 422 may communicate with the gateways by using the S1, interface.

Figure 5A:
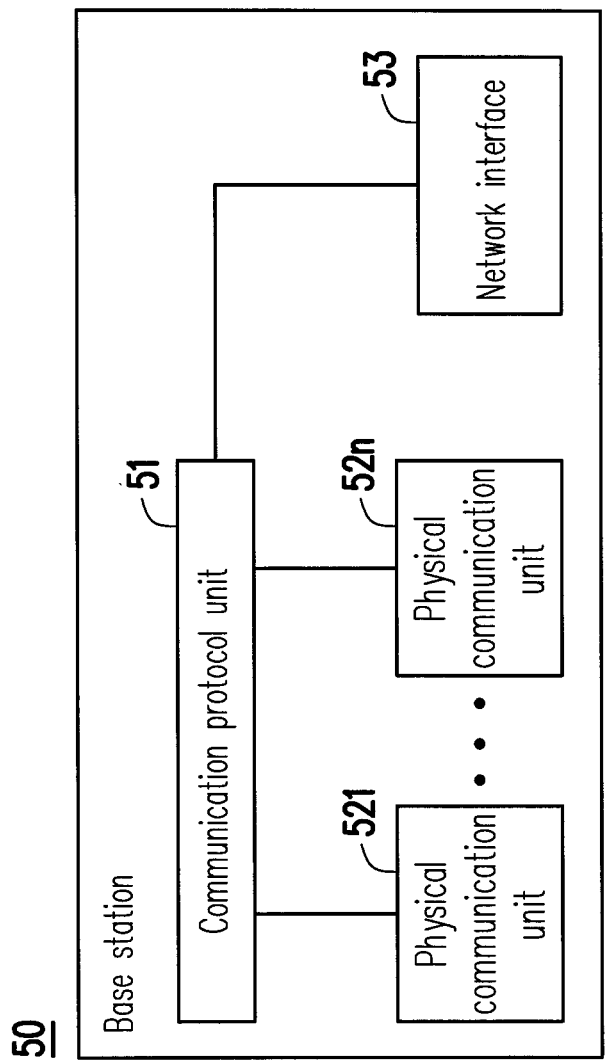
FIG. 5A is a functional block diagram illustrating a base station according to an exemplary embodiment.

FIG. 5A is a functional block diagram illustrating a wireless communication station (e.g., a base station) according to an exemplary embodiment. Referring to FIG 5A, a base station 50 may include at least a communication protocol unit 51, a physical communication unit 521, . . . , a physical communication unit 52n,, and a network interface 53. For example, the physical communication unit 521, . . . , a physical communication unit 52n, may be a radio communication unit 521, an optical communication unit 522, and/or an acoustic communication unit 523, and so like. The physical communication unit 521, . . . , and the physical communication unit 52n, are configured for providing corresponding wireless access carrier components for communicating with remote head device(s) and UE(s) within the wireless service coverage area of the base station 50.

In practical implementation, each of the physical communication unit 521, . . . , and the physical communication unit 52n, could be a transceiver circuit which is connected to its corresponding (not shown in FIG. 5A) wireless transceiving means (such as an antenna, an optical signal transmitter or an optical signal receiver, or an acoustic signal transmitter or an acoustic signal receiver). Also, the transceiver circuit in each of the physical communication unit 521, . . . , a physical communication unit 52n could be configured for performing analog-to-digital signal conversion, digital-to-analog signal conversion, modulation, demodulation, signal amplification, low pass filtering, band pass filtering, and so forth. Further, the transceiver circuit provides the received message (converted from radio signals transmitting by wireless communication devices) to the communication protocol unit 51, modulates the message from communication protocol unit 51 into modulated radio signals, and further transmits the modulated radio signals to the wireless communication device(s) over its corresponding carrier component.

Referring to FIG. 5A, the wireless communication station (e.g., base station 50) including at least the communication protocol unit 51, the physical communication unit 521, . . . , the physical communication unit 52n,, and the network interface 53, could include a wireless communication protocol stack, having communication protocol stack software units which may operate in a Layer 1, (physical layer), Layer 2, (L2), IP, UDP, GTP, SCTP, S1-AP, X2-AP, and so forth. The network interface 53 is connected to the communication protocol unit 51, and is configured for connecting the base station 50 with other networking entities such as MME/S-GW, network controllers and other base stations or remote head device(s).

The communication protocol unit 51 could include at least a processor unit (not shown in FIG. 5A), and at least a communication protocol stack software (or communication protocol stack firmware). Each processor unit may include multiple processor cores, and when the processor unit executes communication protocol stack software (which includes instruction codes corresponding to procedures in the Layer 1 (physical layer), the Layer 2, (L2), IP, UDP, GTP, SCTP, S1-AP, X2-AP, and so forth), the communication protocol unit 51 could perform relevant procedures corresponding to the Layer 1, (physical layer), the Layer 2, (L2), IP, UDP, GTP, SCTP, S1-AP, X2-AP, and so forth. For example, the communication protocol unit 51 could perform related functions in aggregation of heterogeneous carrier components in the Layer 2, or below the Layer 2,, and meanwhile the communication protocol unit 51 could further perform related procedures illustrated in following FIGS. 6-20.

Figure 5B:
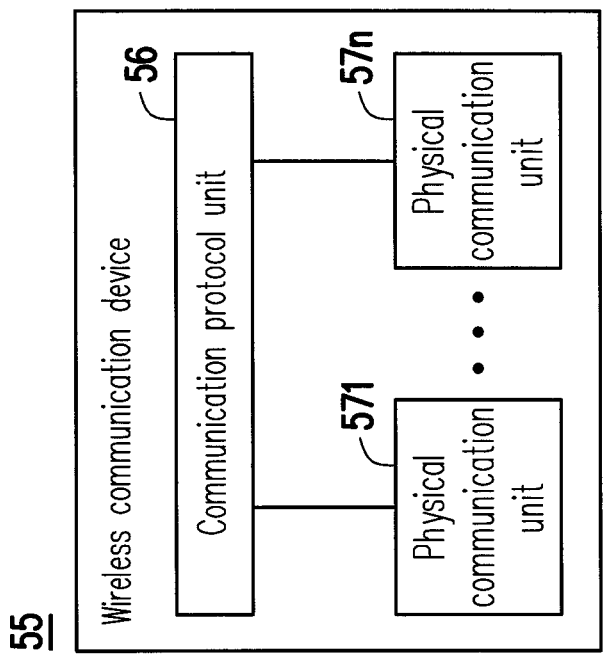
FIG. 5B is a functional block diagram illustrating a wireless communication device according to an exemplary embodiment.

FIG. 5B is a functional block diagram illustrating a wireless communication device according to an exemplary embodiment. Referring to FIG. 5B, a wireless communication device 55 may include at least a communication protocol unit 56, a physical communication unit 571, . . . , and a physical communication unit 57n. For example, the physical communication unit 571, . . . , and the physical communication unit 57n, may be a radio communication unit 571, an optical communication unit 572, and/or an acoustic communication unit 573, and so like. The physical communication unit 571, . . . , the physical communication unit 57n, are configured for providing corresponding wireless access carrier components for communicating with remote head device(s) or base station(s).

In practical implementation, each of the physical communication unit 571, . . . , the physical communication unit 57n, could be a transceiver circuit which is connected to its corresponding (not shown in FIG. 5B) wireless transceiving means (such as an antenna, an optical signal transmitter or an optical signal receiver, or an acoustic signal transmitter or an acoustic signal receiver). Also, the transceiver circuit in each of the physical communication unit 571, . . . , the physical communication unit 57n, could be configured for performing analog-to-digital signal conversion, digital-to-analog signal conversion, modulation, demodulation, signal amplification, low pass filtering, band pass filtering, and so forth. Further, the transceiver circuit provides the received message (converted from radio signals transmitting by wireless communication network) to the communication protocol unit 56, modulates the message from communication protocol unit 56 into modulated radio signals, and further transmits the modulated radio signals to the wireless communication device(s) over its corresponding carrier component.

Referring to FIG. 5B, the wireless communication device 55 including the communication protocol unit 56, physical communication unit 571, . . . , and the physical communication unit 57n, could include a wireless communication protocol stack, having communication protocol stack software units which may operate in a Layer 1, (physical layer), Layer 2, (L2), IP, UDP, GTP, SCTP, S1-AP, X2-AP, and so forth.

The communication protocol unit 56 could include at least a processor unit (not shown in FIG. 5B), and at least a communication protocol stack software (or communication protocol stack firmware). Each processor unit may include multiple processor cores, and when the processor unit executes communication protocol stack software (which includes instruction codes corresponding to procedures in Layer 1

(physical layer), Layer 2, (L2), IP, UDP, GTP, SCTP, S1-AP, X2-AP, and so forth), the communication protocol unit 56 could perform relevant procedures corresponding to the Layer 1, (physical layer), Layer 2, (L2), IP, UDP, GTP, SCTP, S1-AP, X2-AP, and so forth. For example, the communication protocol unit 56 could perform related functions in aggregation of heterogeneous carrier components in the Layer 2, or below the Layer 2,, and meanwhile the communication protocol unit 56 could further perform related procedures illustrated in following FIGS. 6-20.

Figure 6A:
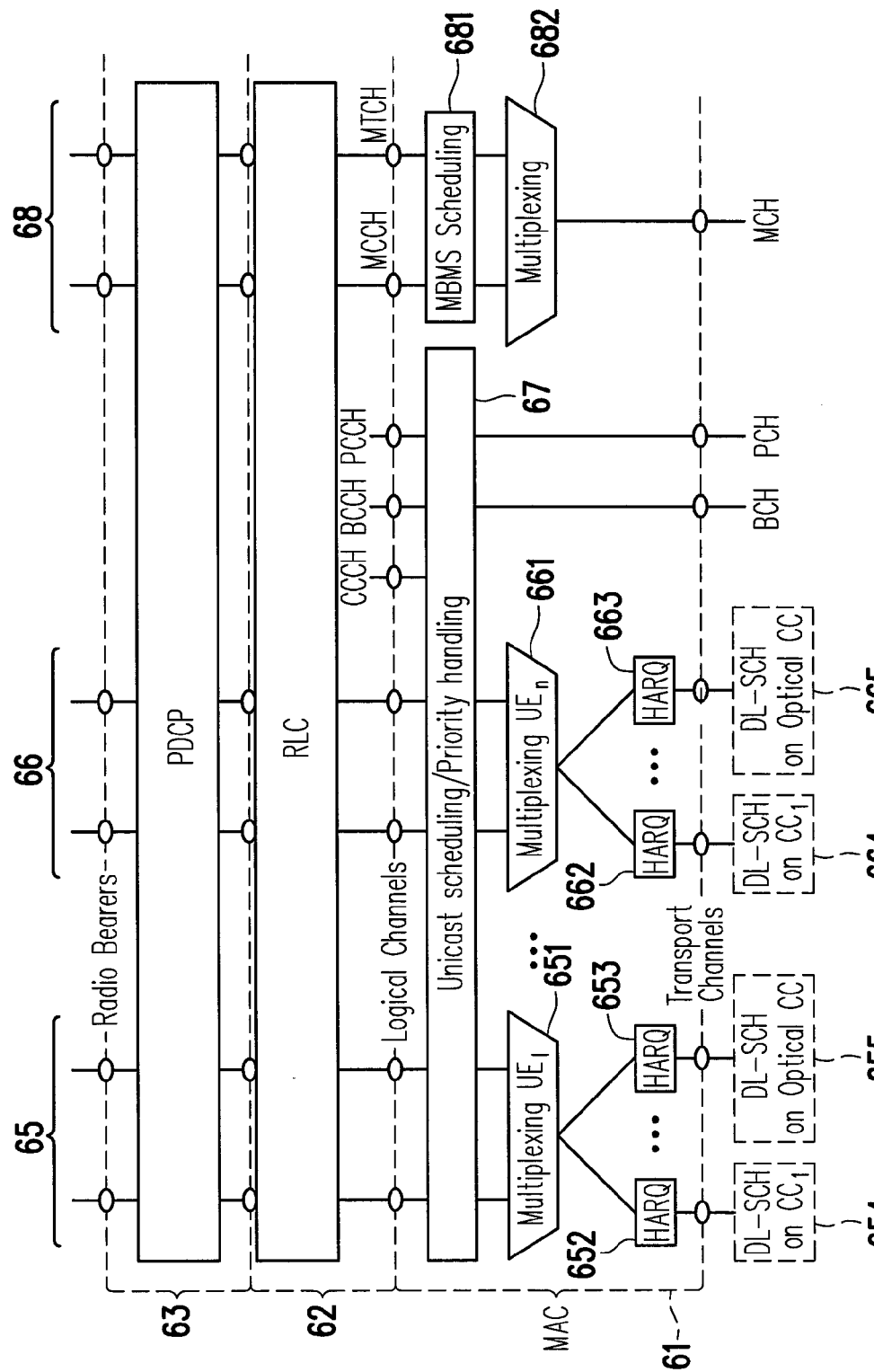
FIG. 6A is a schematic diagram illustrating a Layer 2, protocol stack of a communication method for aggregation of heterogeneous carrier components according to an embodiment of the disclosure.

FIG. 6A is a schematic diagram illustrating a Layer 2, protocol stack of a communication method for aggregation of heterogeneous carrier components according to an embodiment of the disclosure. An example of Layer 2, (L2) structure for DL with OCC configured can be seen from FIG. 6A. The Layer 2, may include the following sub-layers: Medium Access Control (MAC), Radio Link Control (RLC) and Packet Data Convergence Protocol (PDCP). Referring to FIG. 6A, in this embodiment, a secondary OCC is configured for a UE. As shown in FIG. 6A, the heterogeneous carrier aggregation of the physical layers is exposed to the MAC layer for which at least one HARQ entity may be needed for a configured CC. For example, one HARQ entity for each configured ROH cell for a UE may be needed. The MAC layer may be responsible for a joint scheduling for heterogeneous CC(s).

To be illustrated in more details, the protocol stack enclosed by a reference number 65 is responsible for serving a first UE, and the protocol stack enclosed by a reference number 66 is responsible for serving a second UE. The protocol stack can be executed by the communication protocol unit 51 of the base station 50, and can include at least a physical layer (not explicitly shown in FIG. 6A), a MAC layer 61, a radio link control (RLC) layer 62 and a packet data convergence protocol (PDCP) layer 63. For the first UE, a DL-shared channel (DL-SCH) 654 on $CC_1$, may refer to a primary carrier component over a RCC, and a DL-SCH 655 on an optical CC may refer to a secondary carrier component over an OCC for the first UE. In the MAC layer, there are HARQ entity 652 and HARQ entity 653 respectively for the RCC 654 and the OCC 655. The communication protocol unit 51 could include a multiplexer 651 to multiplex MAC SDUs from one or different logical channels into transport blocks (TBs) delivered to the physical layers through their respective HARQ entity 652 and HARQ entity 653. A unicast scheduling entity 67 exposed over the multiplexer 651 is configured for unicast traffic scheduling/priority handling. The RLC layer 62 exposed over the MAC layer 61 could be configured for packet segmentation, ARQ and so forth. The PDCP layer 63 exposed over the RLC layer 62 could be configured for providing functions in security and ROHC. Similarly, the details of a multiplexer 661, HARQ entity 662 and HARQ entity 663, and a primary CC 664 and the OCC 665 for the second UE may be referred to the previous descriptions for the first UE.

FIG. 6A also illustrates radio bearers exposed over the PDCP layer 63, logical channels such as CCCH, BCCH and PCCH over the MAC layer 61, and transport channels such as BCH, PCH and MCH exposed below the MAC layer 61, but their detailed technical contents are not disclosed here since the major concept in the present disclosure is aggregation of heterogeneous carrier components in the Layer 2, or below the Layer 2.

Figure 7:
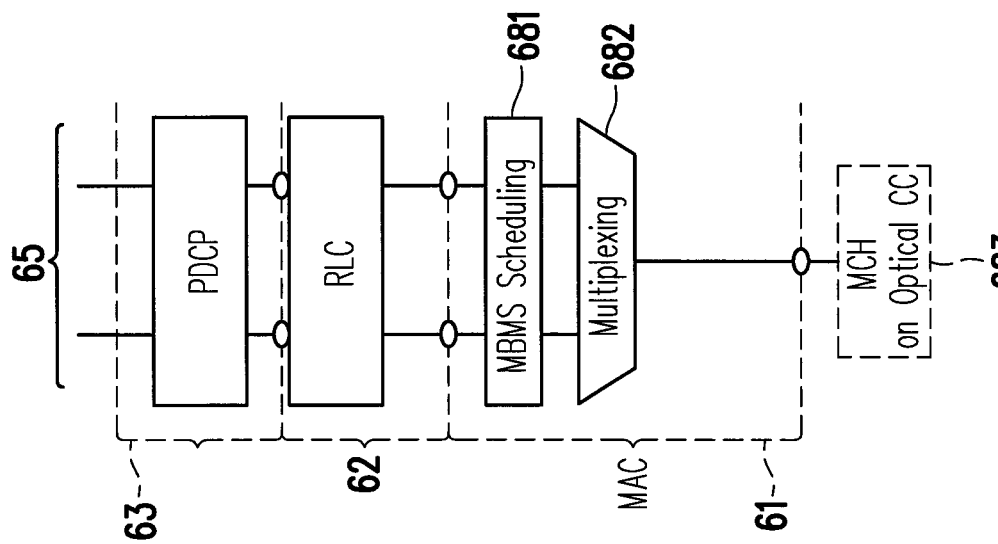
FIG. 7 is a schematic diagram illustrating a Layer 2, protocol stack for downlink multicast/broadcast on optical carrier component according to an embodiment of the disclosure.

FIG. 6A also illustrates protocol stack for DL multicast/broadcast service(s). The protocol stack enclosed by a reference number 68 is responsible for DL multicast/broadcast service(s). FIG. 7 is a schematic diagram illustrating a Layer 2 protocol stack for DL multicast/broadcast on optical carrier component according to an embodiment of the disclosure. An example of L2, structure to support Multimedia Broadcast Multicast Service (MBMS) on Optical CC is illustrated in FIG. 7. Referring to FIG. 7, a multicast channel (MCH) on optical CC 683 is configured for providing broadcast and/or multicast traffic over OCC. A MBMS scheduling unit 681 is exposed below the RLC layer 62 and connected to the RLC layer 62 through logical channels MCCH and MTCH. The MBMS scheduling unit 681 schedules DL multicast/broadcast traffic from the MCCH and MTCH, and a multiplexer 682 multiplexes the DL multicast/broadcast traffic from logical channels MCCH and MTCH into transport block(s) to the physical layers for the OCC 683.

Figure 8:
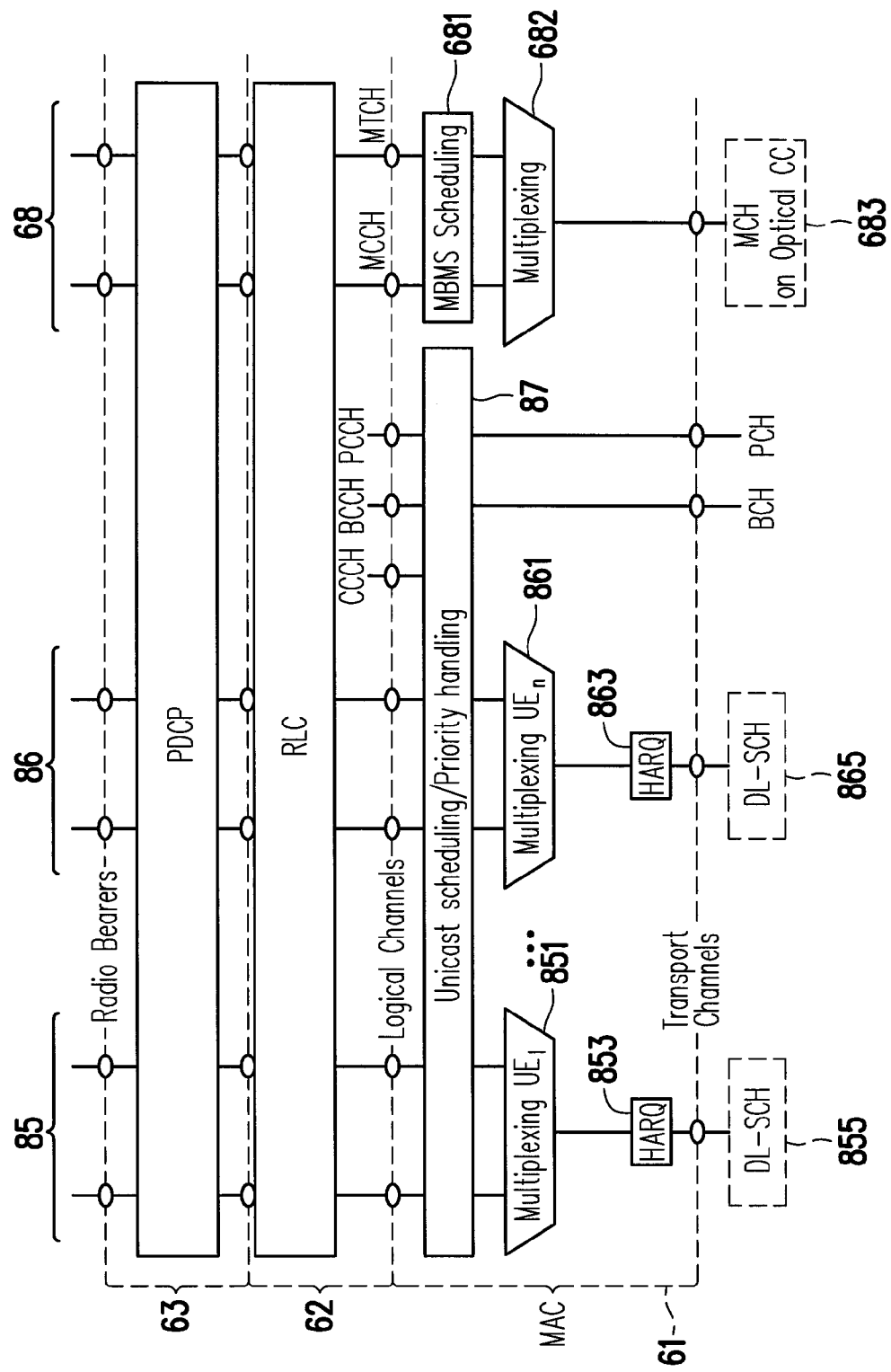
FIG. 8 is a schematic diagram illustrating a Layer 2, protocol stack of a communication method for supporting unicast service(s) on RCC(s) and supporting MBMS on OCC according to an embodiment of the disclosure.

An example of the Layer 2, structure to support unicast service(s) on RCC, and support multicast and/or broadcast service(s) on OCC can be found in FIG. 8. FIG. 8 is a schematic diagram illustrating a Layer 2, protocol stack of a communication method for supporting unicast service(s) on RCC(s) and supporting multicast and/or broadcast service(s) on OCC according to an embodiment of the disclosure. For example, in the embodiment illustrated in FIG. 8, the protocol stack enclosed by a reference number 85 is responsible for serving a first UE, and the protocol stack enclosed by a reference number 86 is responsible for serving a second UE.

The protocol stack can be executed by the communication protocol unit 51 of the base station 50, and can include at least a physical layer (not explicitly shown in FIG. 8), a MAC layer 61, a radio link control (RLC) layer 62 and a PDCP layer 63. For the first UE, a DL-SCH 855 may refer to a RCC for the first UE, and a DL-SCH 865 may refer to a RCC for the second UE.

Referring to FIG. 8, in the MAC layer 61, there are HARQ entity 853 and HARQ entity 863 respectively for the RCC 855 and the RCC 865. The communication protocol unit 51 may include a multiplexer 851 to multiplex DL unicast traffic from an upper layer and transmit the DL unicast traffic over the RCC 855 for the first user. The communication protocol unit 51 may include a multiplexer 861 to multiplex DL unicast traffic from an upper layer and transmit the DL unicast traffic over the RCC 865 for the second user. A unicast scheduling entity 87 exposed over the multiplexer 851, 861 is configured for unicast traffic scheduling/priority handling. The RLC layer 62 exposed over the MAC layer 61 could be configured for packet segmentation, ARQ and so forth. The PDCP layer 63 exposed over the RLC layer 62 could be configured for providing functions in security and ROHC. Similarly, the details of the MBMS scheduler 681, the multiplexer 682, and MCH on the OCC 683 can be referred to FIG. 6A or FIG. 7.

Figure 9:
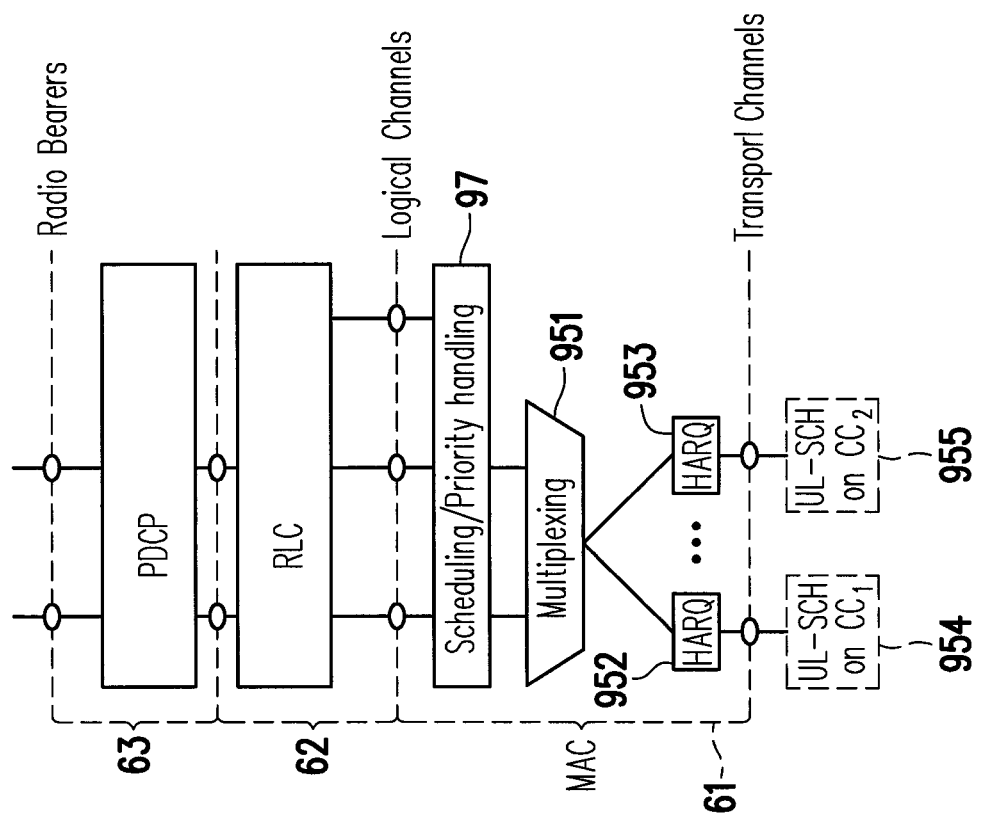
FIG. 9 shows a Layer 2, uplink protocol stack structure for the case where only downlink transmission is supported on a secondary ROH cell.

In some embodiments, only downlink transmission is supported in the ROH cell. For this case, it may not be required to have additional HARQ entity for configured ROH cell for the UL. FIG. 9 shows a Layer 2, uplink protocol stack structure for the case where only downlink transmission is supported on a secondary ROH cell. As shown in FIG. 9, the heterogeneous carrier aggregation of the physical layers is exposed to the MAC layer for which at least one HARQ entity may be needed for a configured CC. For example, one HARQ entity for each configured ROH cell for a UE may be needed. The MAC layer may be responsible for a joint scheduling for heterogeneous CC(s).

To be illustrated in more details, the protocol stack illustrated in FIG. 9 can be executed by the communication protocol unit 56 of the wireless communication device 55, and may include at least a physical layer (not explicitly shown in FIG. 9), a MAC layer 61, a RLC layer 62 and a PDCP layer 63.

For the UE, a UL-SCH 954 on CC$_1$ may refer to a primary UL carrier component over a RCC, and a UL-SCH 955 on CC$_2$ may refer to a secondary UL carrier component over an RCC for the same UE. In the MAC layer 61, there are HARQ entity 952 and HARQ entity 953 respectively for the primary CC 954 and the RCC 955. The communication protocol unit 56 could include a multiplexer 951 to multiplex MAC SDUs from one or different logical channels into transport blocks (TBs) delivered to the physical layers through their respective HARQ entity 952 and HARQ entity 953. A scheduling entity 97 exposed over the multiplexer 951 is configured for UL traffic scheduling/priority handling. The RLC layer 62 exposed over the MAC layer 61 could be configured for packet segmentation, ARQ and so forth. The PDCP layer 63 exposed over the RLC layer 62 could be configured for providing functions in security and ROHC.

Figure 10:
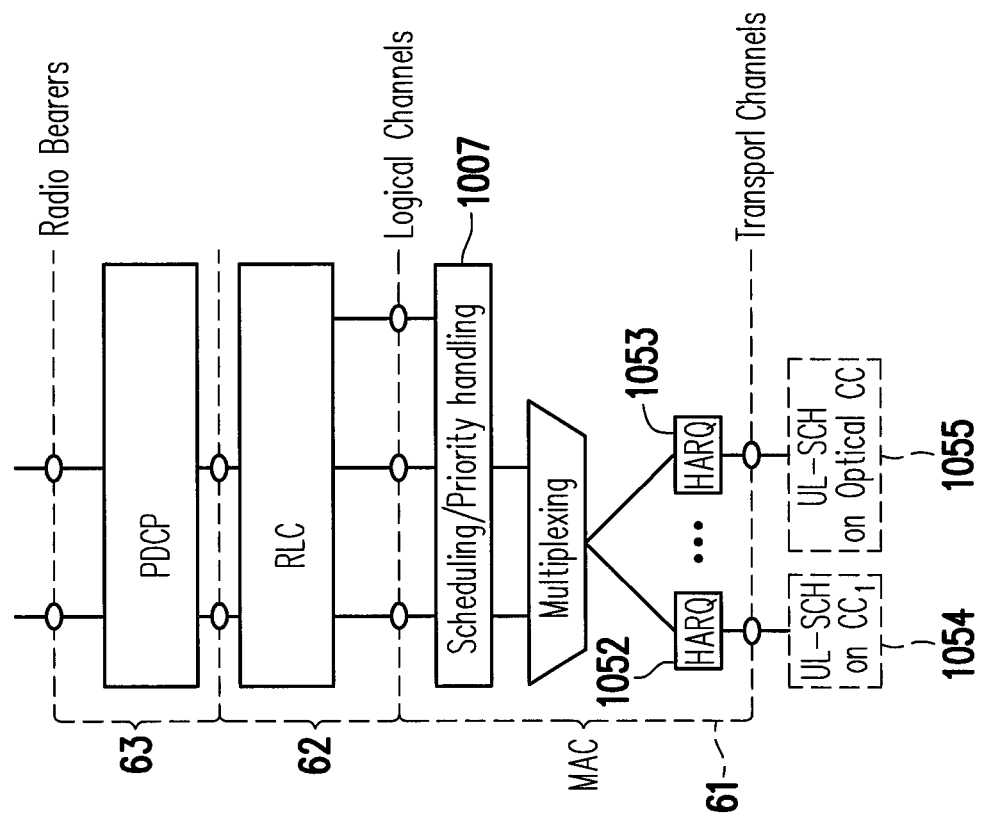
FIG. 10 shows a Layer 2, uplink protocol stack structure for the case uplink transmission is supported on a secondary ROH cell.

In other embodiments, UL transmission may be supported in the ROH cell. For this case, the Layer 2, structure is illustrated as FIG. 10. FIG. 10 shows a Layer 2 uplink protocol stack structure for the case uplink transmission is supported on a secondary ROH cell. The protocol stack illustrated in FIG. 10 can be executed by the communication protocol unit 56 of the wireless communication device 55, and can include at least a physical layer (not explicitly shown in FIG. 10), a MAC layer 61, a RLC layer 62 and a PDCP layer 63. For the UE, a UL-SCH 1054 on CC$_1$, may refer to a primary UL carrier component over a RCC, and a UL-SCH 1055 on an Optical CC may refer to a secondary UL carrier component over an OCC for the same UE. In the MAC layer 61, there are HARQ entity 1052 and HARQ entity 1053 respectively for the primary UL CC 1054 and the UL OCC 1055. The communication protocol unit 56 could include a multiplexer 1051 to multiplex MAC SDUs from one or different logical channels into transport blocks (TBs) delivered to the physical layers through their respective HARQ entity 1052 and HARQ entity 1053.

A scheduling entity 1007 exposed over the multiplexer 1051 is configured for UL traffic scheduling/priority handling. The RLC layer 62 exposed over the MAC layer 61 could be configured for packet segmentation, ARQ and so forth. The PDCP layer 63 exposed over the RLC layer 62 could be configured for providing functions in security and ROHC.

The HARQ entity illustrated in FIGS. 6-10 could be designed in physical (PHY) layer, for example in IEEE 802.16, specification, instead of being designed in the MAC layer as mentioned previously. As such, the aggregation of RCC(s), OCC(s), ACC(s) in the protocol stack can be below the MAC layer.

Figure 6B:
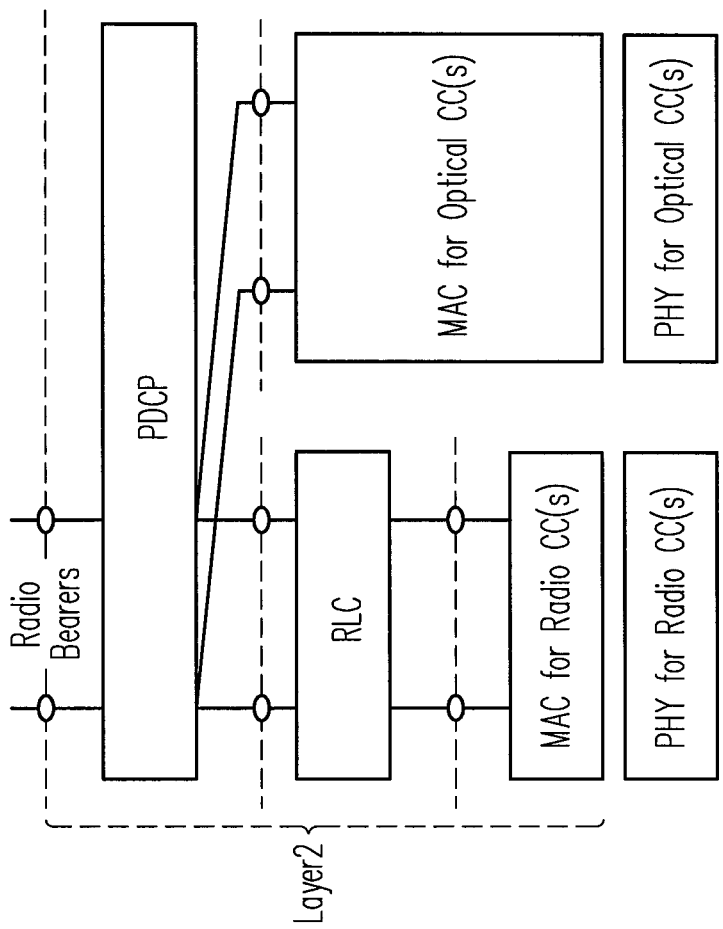
FIG. 6B is a schematic diagram illustrating a Layer 2, protocol stack of a communication method for aggregation of heterogeneous carrier components according to an embodiment of the disclosure.

FIG. 6B is a schematic diagram illustrating a Layer 2, protocol stack of a communication method for aggregation of heterogeneous carrier components according to an embodiment of the disclosure. An example of Layer 2, (L2) structure for DL with OCC configured can be seen from FIG. 6B. The Layer 2, may include the following sub-layers: Medium Access Control (MAC), Radio Link Control (RLC) and Packet Data Convergence Protocol (PDCP). Referring to FIG. 6B, in this embodiment, the heterogeneous carrier aggregation is exposed to the PDCP layer. As illustrated in FIG. 6B, the MAC protocol(s) and/or PHY protocol(s) for optical CC(s), such as IEEE 802.15.7,, may be needed. The technical details may be performed in a manner similar to that illustrated in FIG. 6A.

Figure 6C:
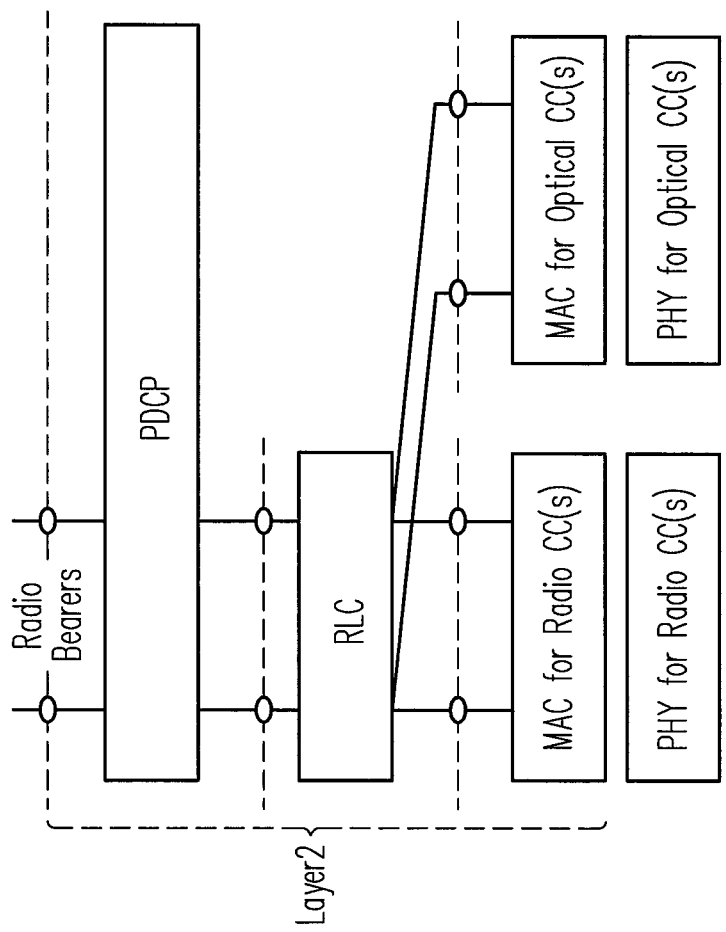
FIG. 6C is a schematic diagram illustrating a Layer 2, protocol stack of a communication method for aggregation of heterogeneous carrier components according to an embodiment of the disclosure.

FIG. 6C is a schematic diagram illustrating a Layer 2, protocol stack of a communication method for aggregation of heterogeneous carrier components according to an embodiment of the disclosure. An example of Layer 2, (L2) structure for DL with OCC configured can be seen from FIG. 6C. The Layer 2, may include the following sub-layers: Medium Access Control (MAC), Radio Link Control (RLC) and Packet Data Convergence Protocol (PDCP). Referring to FIG. 6C, in this embodiment, the heterogeneous carrier aggregation is exposed to the RLC layer. As illustrated in FIG. 6C, the MAC protocol(s) and/or the PHY protocol(s) for optical CC(s), such as IEEE 802.15.7,, may be needed. The technical details may be performed in a manner similar to that illustrated in FIG. 6A.

Figure 11:
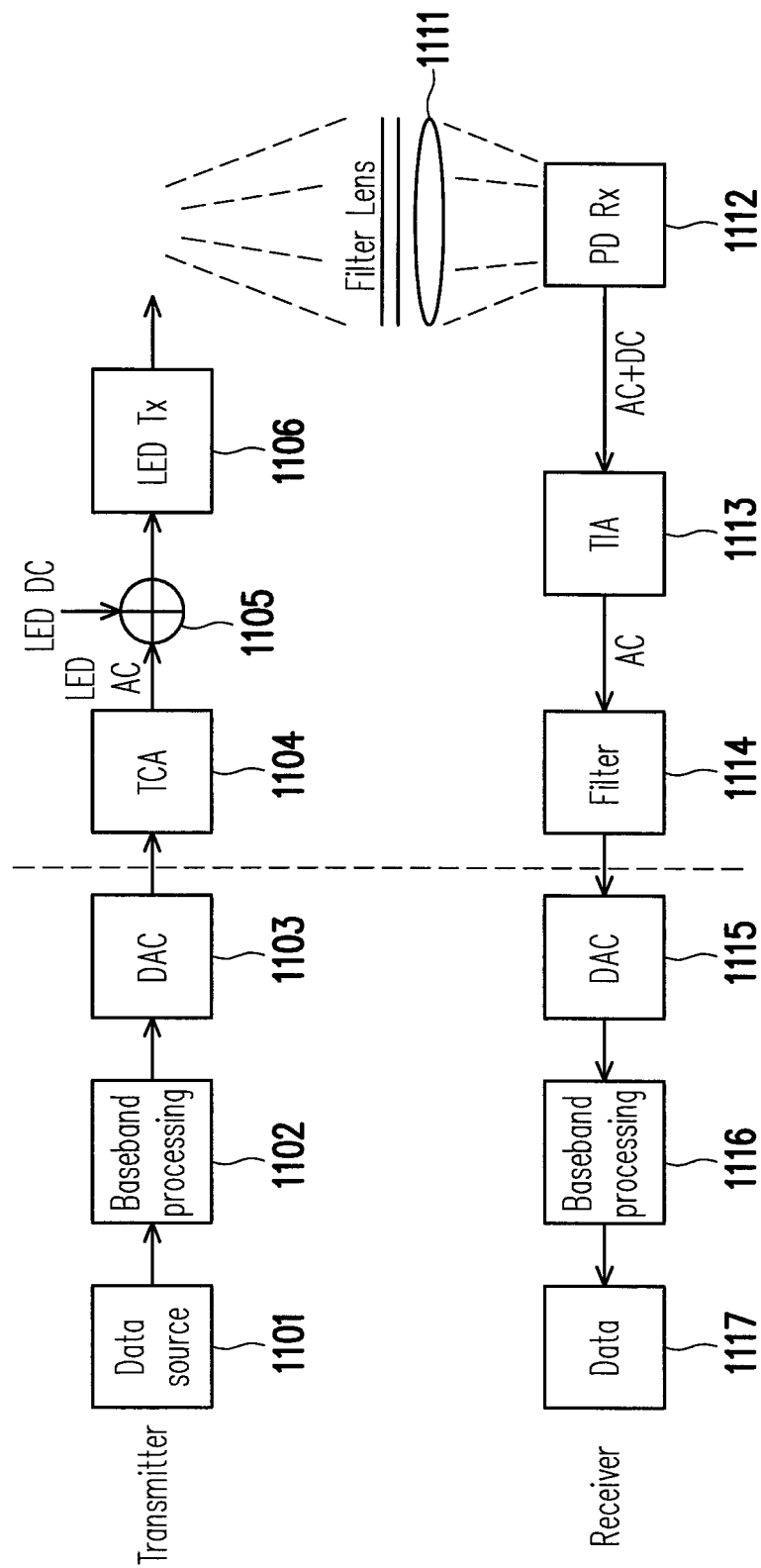
FIG. 11 is a schematic diagram illustrating physical channel processing for communication based on visible light communication (VLC).

Besides, an example of block diagram for visible light communication (VLC) physical channel processing is also illustrated in FIG. 11. FIG. 11 is a schematic diagram illustrating physical channel processing for communication based on visible light communication (VLC). For example, after transport block(s) are delivered to physical layer(s) through HARQ entity (e.g., HARQ entity 653 or HARQ entity 1053) for OCC, the physical channel processing illustrated in FIG. 11 may be performed in physical layer(s). Referring to FIG. 11, an upper portion of FIG. 11 is the transmitter using the VLC technique to communicate with the receiver illustrated on lower portion of FIG. 11. Signal processing in digital domain is on the left hand side of a dashed line in FIG. 11, in which data source 1101 is processed in baseband processing unit 1102 and then further processed in DAC 1103 to generate analog signal. On the right hand side of the dashed line in FIG. 11, analog signal is input to Trans-conductance amplifier (TCA) 1104 to generate a current output (shown as LED AC) signal, which is further mixed with a light emitting diode (LED) DC driving current signal by a mixer 1105, and finally input to an LED device 1106. The LED device 1106 outputs VLC signal.

The receiver uses filter lens unit 1111 to filter signal outside a preconfigured VLC bandwidth, and a photodiode (PD) 1112 receives the VLC signal and then generates analog signal (which includes AC portion and DC portion). A Trans-impedance amplifier (TIA) 1113 receives the analog signal from the PD 1112, and then generates the AC signal. The filter 1114 further filters out noise in the AC signal, and a DAC 1115 converts the analog signal to digital signal. The digital signal from the DAC 1115 is further processed by a baseband processing unit 1116 and recovered to be data source 1117 at the receiver.

Figure 12:
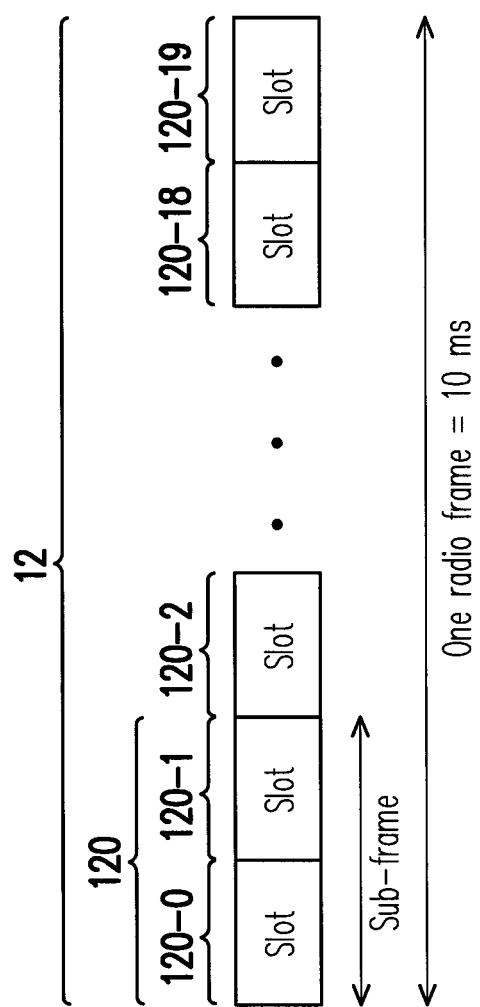
FIG. 12 shows an example of a frame structure for optical component carrier OCC according to an exemplary embodiment.

FIG. 12 shows an example of a frame structure for optical component carrier OCC according to an exemplary embodiment. Referring to FIG. 12, one radio frame or one OCC frame 12 can be allocated with a frame duration of 10, ms. Also, each 10 ms radio frame may be divided into ten of equally sized sub-frames such as a sub-frame 120 includes slot 120-0 and slot 120-1. Each sub-frame may consist of two equally sized slots 120-0 and 120-1. Slots 120-0, 120-1, 120-2, . . . , 120-18 and 120-19 may be available for DL/UL transmission in each 10, ms interval. Further, the physical channels of OCC may include at least one of the following channels: synchronization channel (SCH), Physical downlink control channel (PDCCH), and Physical downlink shared channel (PDSCH). The SCH may be used by a UE for DL timing synchronization and is optional in this embodiment. The PDCCH may inform the UE about the resource allocation for DL assignment and/or UL grants, and/or Hybrid ARQ information related to UL traffic. In addition, the PDSCH may be used to carry the DL traffic (DL-SCH). The PDCCH for the OCC may not be needed if cross-layer scheduling is supported in both the base station and the UE.

Figure 13:
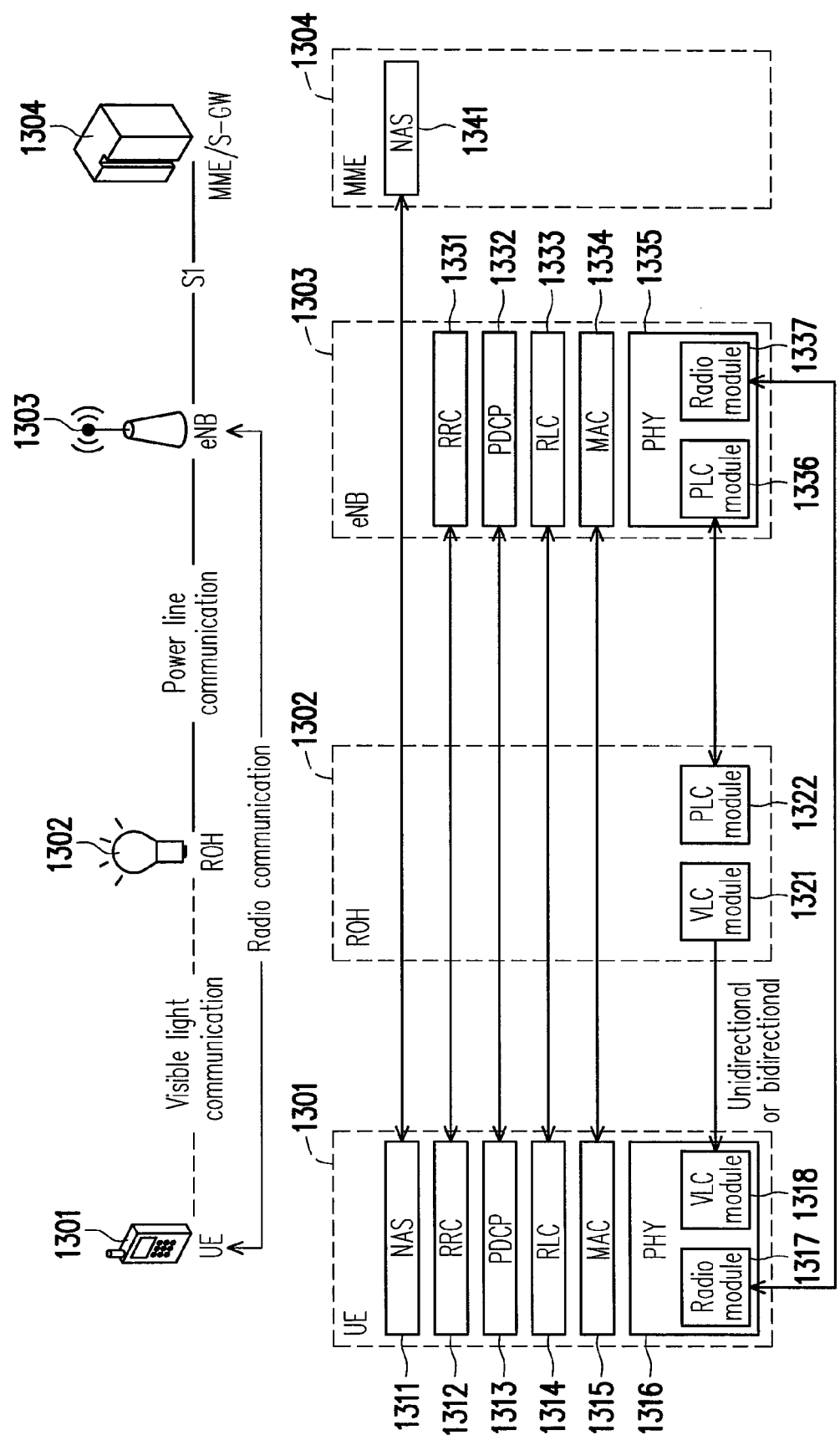
FIG. 13 illustrates a control-plane protocol stack for the case in which a remote optical head device is connected with an eNodeB by using power line communication.

FIG. 13 illustrates a control-plane protocol stack for the case in which ROH is connected with an eNodeB by using power line communication (PLC). Some PHY functions/entities may be shared by Radio module, PLC module, and/or VLC module. Referring to FIG. 13, this exemplary embodiment illustrates a UE 1301 communicating with a ROH device 1302 through VLC, the ROH device 1302 communicating with an eNodeB (or eNB) 1303 through power line communication technology (PLC), and the eNodeB 1303 communicating with the UE 1301 through radio communication technology. The eNodeB 1303 may be connected with the MME/S-GW 1304 through the Si interface. The protocol stack shown on the lower portion of FIG. 13 further illustrates the control-plane protocol stack for the case in which the ROH device 1302 communicates with the eNodeB 1303 through PLC.

To be illustrated more clearly, referring to FIG. 13, the UE 1301 includes a non-access stratum (NAS) layer 1311, a radio resource control (RRC) layer 1312, a PDCP layer 1313, a RLC layer 1314, a MAC layer 1315 and a PHY layer 1316. In the PHY layer 1316, the UE 1301 includes a radio module 1317 and a VLC module 1318, which may be separated by different HARQ entities. Similarly, the eNodeB 1303 includes the RRC layer 1331, the PDCP layer 1332, the RLC layer 1333, the MAC layer 1334 and the PHY layer 1335. In the PHY layer 1335, the eNodeB 1303 includes a radio module 1337 and a PLC module 1336, which may be separated by different HARQ entities. The UE 1301 communicates with the eNodeB 1303 through the radio module 1317 and the radio module 1337. The eNodeB 1303 communicates with the ROH device 1302 through the PLC module 1336 and the PLC module 1322. The UE 1301 communicates with the ROH device 1302 through the VLC module 1318 and the VLC module 1321. Also, the communication link between the UE 1301 and the ROH device 1302 may be unidirectional or bidirectional.

The NAS layer 1311 of the UE 1301 corresponds to an NAS layer 1341 of the MME/S-GW 1304. The RRC layer 1312, the PDCP layer 1313, the RLC layer 1314, the MAC layer 1315 and the PHY layer 1316 respectively correspond to the RRC layer 1331, the PDCP layer 1332, the RLC layer 1333, the MAC layer 1334 and the PHY layer 1335.

Figure 14:
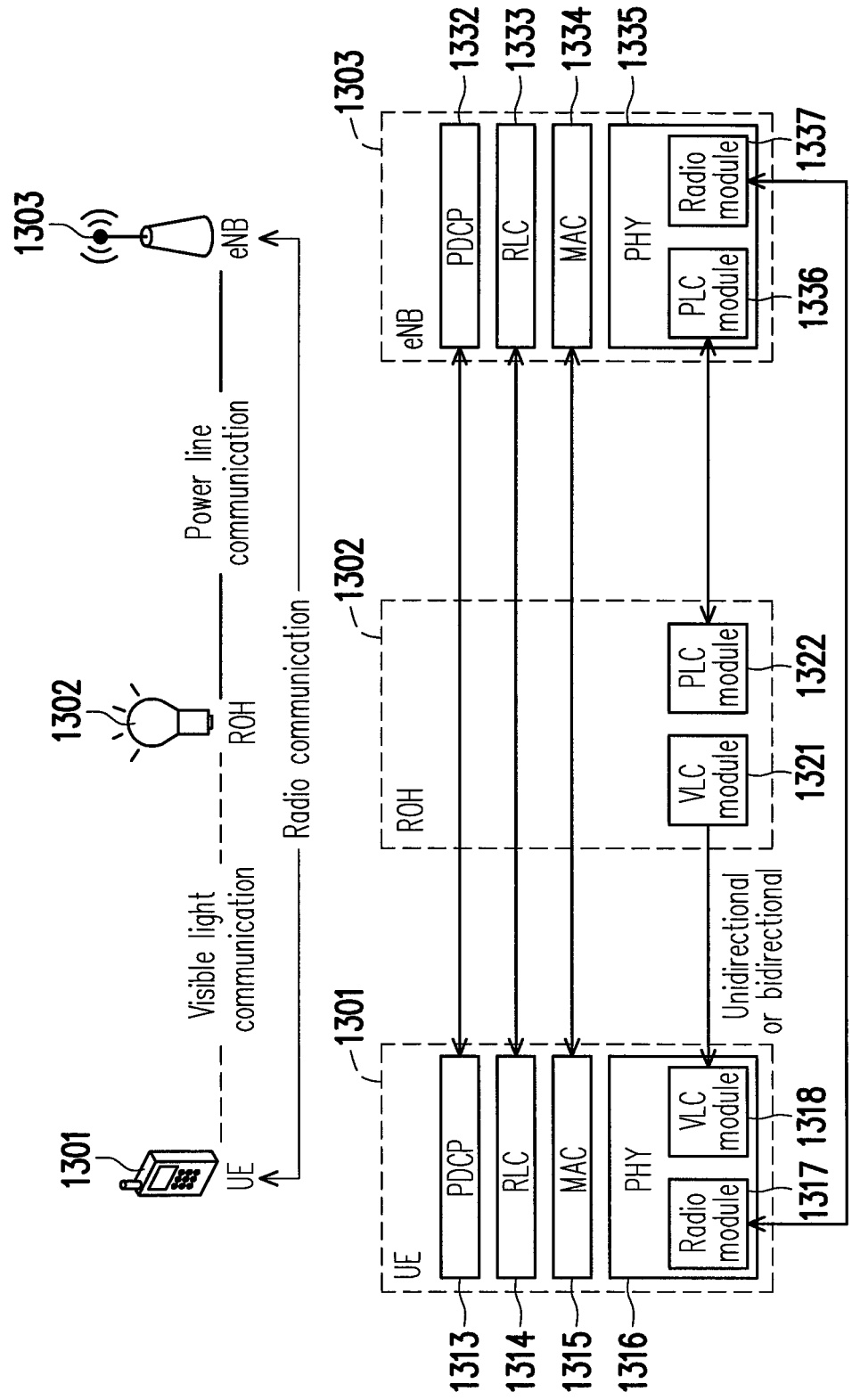
FIG. 14 illustrates a user-plane protocol stack for the case in which remote optical head device is connected with the eNodeB by using power line communication.

FIG. 14 illustrates a user-plane protocol stack for the case in which ROH is connected with the eNodeB by using power line communication (PLC). In the user-plane, the UE 1301 communicates with the ROH device 1302 through VLC, the ROH device 1302 communicates with the eNodeB (or eNB) 1303 through PLC, and the eNodeB 1303 communicates with the UE 1301 through radio communication technology. The protocol stack shown on the lower portion of FIG. 14 further illustrates the user-plane protocol stack for the case in which the ROH device 1302 communicates with the eNodeB 1303 through PLC.

To be illustrated more clearly, referring to FIG. 14, the UE 1301 includes the PDCP layer 1313, the RLC layer 1314, the MAC layer 1315 and the PHY layer 1316. In the PHY layer 1316, the UE 1301 includes the radio module 1317 and the VLC module 1318, which may be separated by different HARQ entities. Similarly, the eNodeB 1303 includes the PDCP layer 1332, the RLC layer 1333, the MAC layer 1334 and the PHY layer 1335. In the PHY layer 1335, the eNodeB 1303 includes the radio module 1337 and the PLC module 1336, which may be separated by different HARQ entities. The UE 1301 communicates with the eNodeB 1303 through the radio module 1317 and the radio module 1337. The eNodeB 1303 communicates with the ROH device 1302 through the PLC module 1336 and the PLC module 1322. The UE 1301 communicates with the ROH device 1302 through the VLC module 1318 and the VLC module 1321. Also, the communication link between the UE 1301 and the ROH device 1302 may be unidirectional or bidirectional.

The PDCP layer 1313, the RLC layer 1314, the MAC layer 1315 and the PHY layer 1316 respectively correspond to the PDCP layer 1332, the RLC layer 1333, the MAC layer 1334 and the PHY layer 1335.

Figure 15:
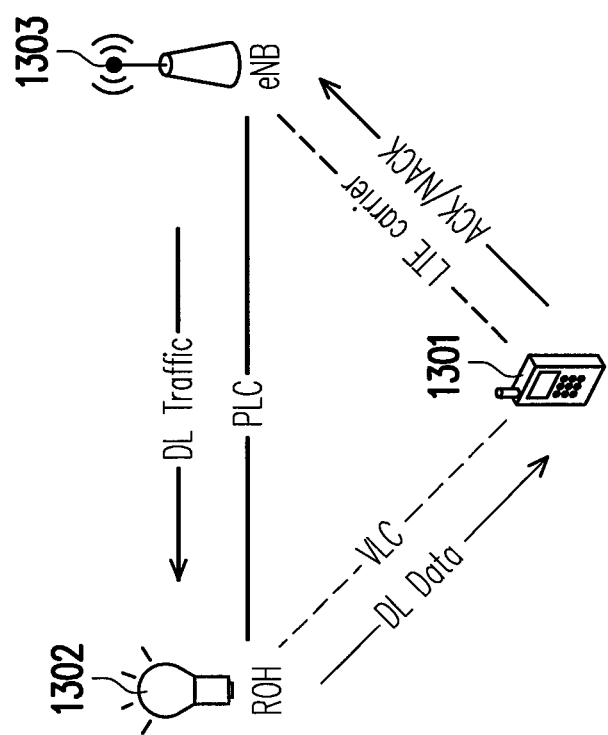
FIG. 15 illustrates downlink transmission on secondary component carrier from an ROH to a UE with the UE feedback HARQ for the downlink data from the secondary component carrier by using the primary component carrier according to an exemplary embodiment.

As for the HARQ feedbacks, it is clear that the HARQ ACK/NACK feedbacks for DL and/or UL data transmitted on primary component carrier (PCC) can be sent through the PCC. FIG. 15 illustrates a DL transmission on SCC from an ROH to a UE with the UE feedback HARQ for the DL data from the SCC by using the PCC according to an exemplary embodiment. For the case of DL transmission on SCC, as illustrated in FIG. 15, the communication network (represented by the eNB 1303) may send data to the ROH by using wired line (e.g., an optical fiber, PLC), and then the ROH may forward the data to the UE by SCC (e.g., by using visible light communication). The UE may feedback the HARQ ACK/NACK for the DL data received from the SCC by using the PCC (e.g., transmitting the HARQ ACK/NACK for the SCC over a RCC such as LTE carrier).

In some embodiments, SCC may provide UL resources for UL transmission. In these cases, the UE may transmit UL data through the SCC (e.g., by using visible light communication), and the communication network may feedback the HARQ ACK/NACK for the UL data through the PCC or the SCC.

Figure 16:
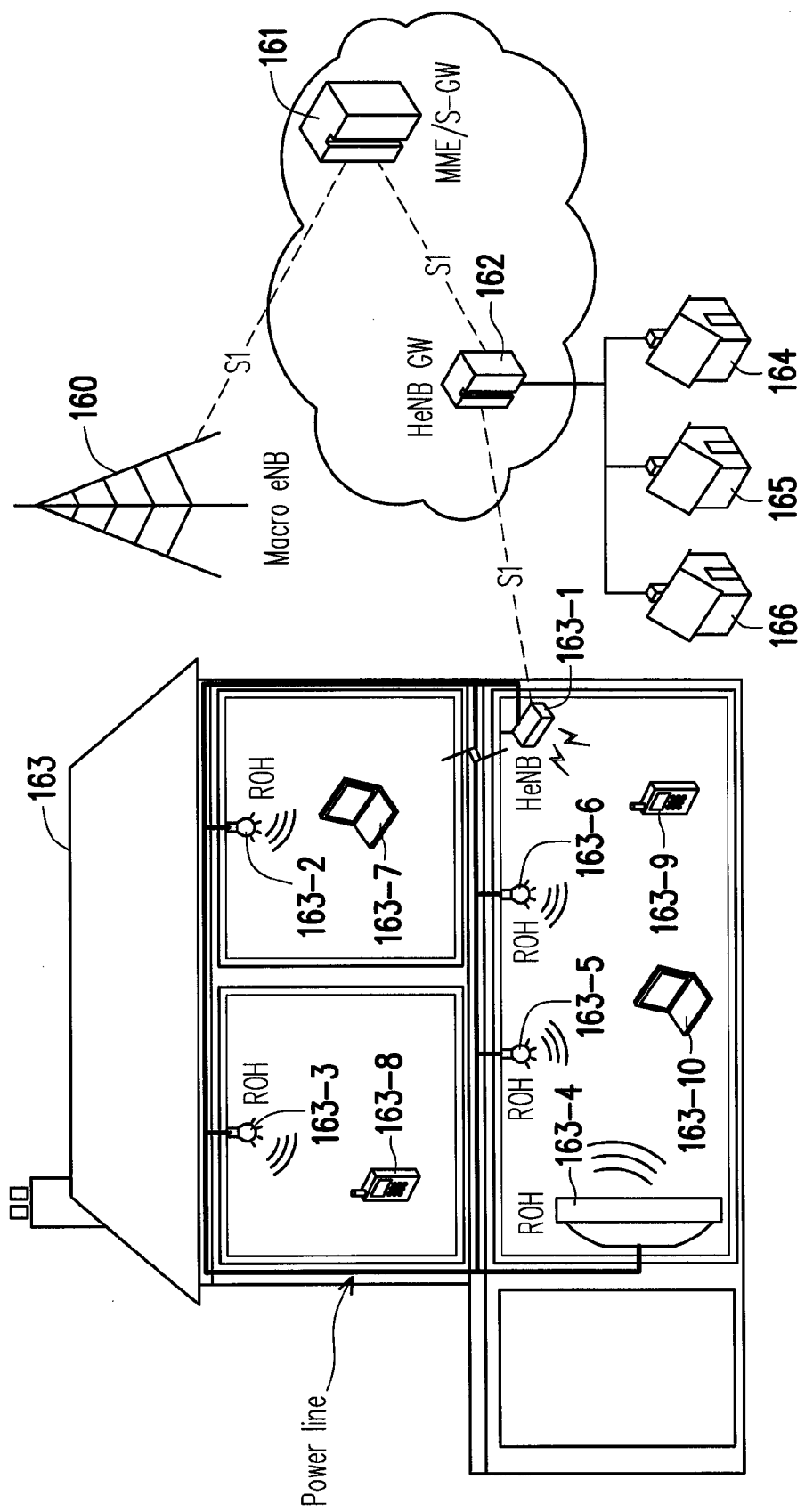
FIG. 16 is a schematic diagram illustrating a communication system based on aggregation of radio component carrier(s) and optical component carrier(s) according to a first exemplary embodiment.

FIG. 16 is a schematic diagram illustrating a communication system based on aggregation of radio component carrier(s) and optical component carrier(s) according to a first exemplary embodiment.

In the first exemplary embodiment, FIG. 16 illustrates a communication system with aggregation of Radio CC(s) and Optical CC(s) in a house. Referring to FIG. 16, the communication system includes a macro eNodeB (eNB) 160 connected to a MME/S-GW 161 with a Si interface, and a home eNodeB gateway (HeNB GW) 162 is also connected to a MME/S-GW 161 with a Si interface. Multiple homes such as homes 163, 164, 165, 166 are connected to the HeNB GW 162, and the home 163 is within wireless service coverage area of the eNB 160.

Referring to FIG. 16, a HeNB 163-1 and one or more ROHs (e.g., LEDs, televisions, and projectors) are deployed in the house 163. The ROHs are equipped with PLC communication modules and VLC communication modules. The house 163 is merely used as an example for explanation and is not intended to limit the present disclosure. The HeNB 163-1 is connected to the HeNB GW 162 through the S1 interface, and is also connected to ROH devices 163-2, 163-3, 163-4, 163-5, 163-6 through power-line communication (PLC). The HeNB 163-1 may provide at least a LTE carrier, and ROH devices 163-2, 163-3, 163-4, 163-5, 163-6 may provide Optical CCs for home users, and are controlled by the HeNB 163-1 through PLC.

In the house 163, a UE 163-8 may receive OCC from the ROH device 163-3 or receive RCC from the macro eNodeB 160. A UE 163-7 may receive OCC from the ROH device 163-2 or receive RCC from the macro eNodeB 160. A UE 163-9 or UE 163-10 may receive OCC from the ROH devices 163-4, 163-5, 163-6 or receive RCC from the macro eNodeB 160 or the HeNB 163-1. Since visible light can be effectively blocked by walls or construction materials of the house 163, interference on OCC(s) from different ROH devices in different rooms can be effectively reduced. In addition, OCC(s) from ROH devices can also effectively increase bandwidth of the UE(s), and effectively reduce power consumptions on radio signal transmission and/or radio signal processing.

In this embodiment, a home user may buy an advanced HeNB 163-1, which may provide at least a LTE cell, and this cell may act as the Primary Cell (PCell) for a UE. This HeNB 163-1 may provide both DL carriers and UL carriers by using FDD or TDD. In addition, the HeNB 163-1 may automatically discover/search available ROH devices 163-2, 163-3, 163-4, 163-5, 163-6 in the house 163. The HeNB 163-1 may aggregate these ROHs 163-2, 163-3, 163-4, 163-5, 163-6 to provide SCell(s). These SCells may provide only DL transmission. The HeNB 163-1 may control and coordinate ROH(s) by using PLC.

Also, the eNB 160 or the HeNB163-1 may have similar component elements and similar functionality as the base station 50. The UEs 163-8, 163-9, 163-10 may have similar component elements and similar functionality as the wireless communication device 55.

Figure 17:
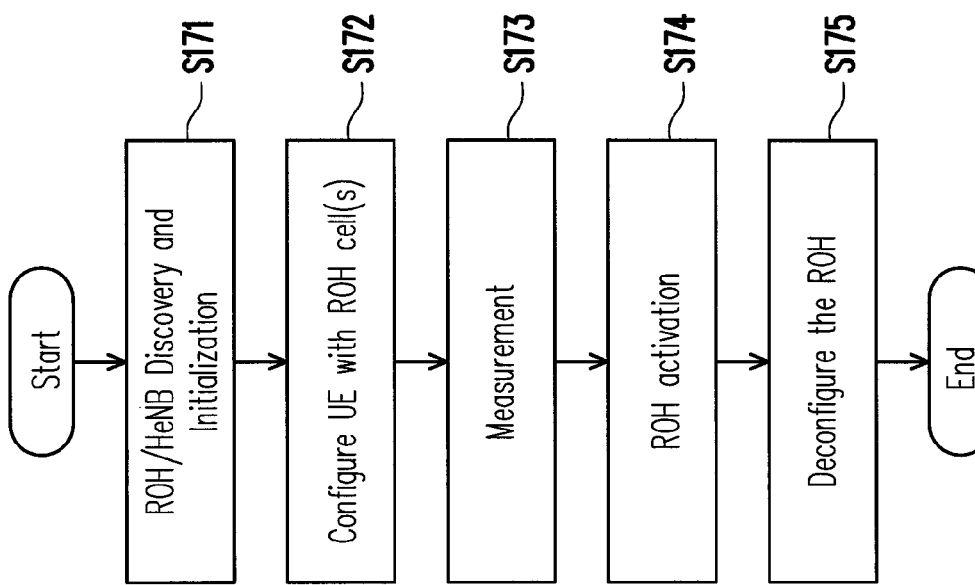
FIG. 17 is a flowchart illustrating operation procedures for a communication method for aggregation of heterogeneous component carriers.

FIG. 17 is a flowchart illustrating operation procedures for a communication method for aggregation of heterogeneous component carriers. It is noted that these steps do NOT need to be performed in the following order. Referring to FIG. 17, the communication method for aggregation of heterogeneous component carriers includes operation procedures S171-S175.

In the procedure S171, ROH device or HeNB performs discovery and initialization. In this step S171, an eNB may discover/search available ROHs (in the house), or ROH may discover/search HeNB. There are proposed three methods for discovering available ROHs described as below.

Figure 18:
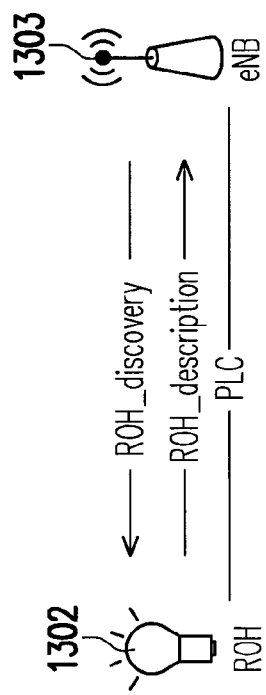
FIG. 18 illustrates a method for discovering available ROHs according to the first exemplary embodiment.

The first method of discovering available ROHs is by using power line communication (PLC). FIG. 18 illustrates a method for discovering available ROHs according to the first exemplary embodiment.

It can be seen from FIG. 18 that the HeNB (or the eNB 1303) may broadcast a ROH_, discovery signalling (e.g., by using PLC). When receiving the ROH_, discovery, the ROH 1302 may reply a ROH_, description information (or ROH_, description message) to the HeNB (or the eNB 1303) by using PLC. The Simple Service Discovery Protocol (SSDP) may be used to discover HeNB and/or ROH. The ROH_, discovery message may include the HeNB information (e.g., IP address) for ROH(s) to reply the ROH_, description. The ROH_, description message may include the ROH information (e.g., IP address) for the HeNB to control the ROH(s).

The second method of discovering available ROHs is UE-assist discovering available ROHs. In this second method, the HeNB may send ROH_, discovery signalling (e.g., by using PLC). When receiving the ROH_, discovery, the ROH may broadcast ROH_, description information (e.g., by visible light). Then, UEs may forward the received ROH_, description information to the HeNB.

Figure 19:
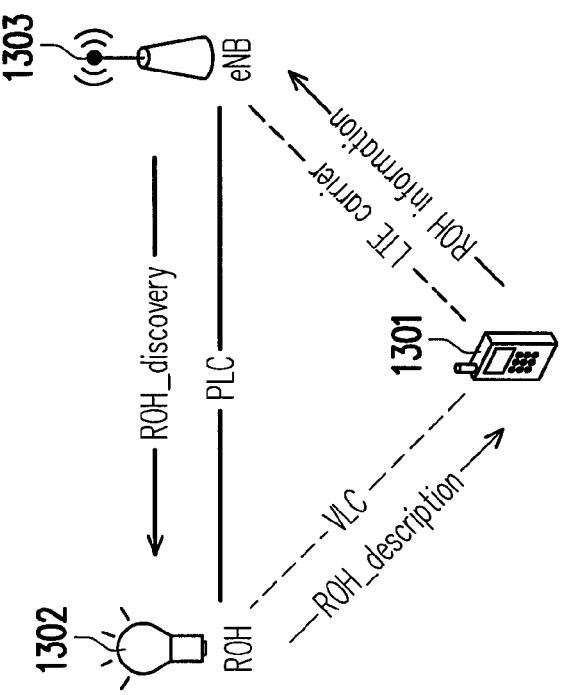
FIG. 19 illustrates another method for discovering available ROHs according to the first exemplary embodiment.

FIG. 19 illustrates another method for discovering available ROHs according to the first exemplary embodiment. Referring to FIG. 19, the eNB 1303 firstly transmit the ROH_, discovery signalling on PLC, the ROH 1302 broadcasts ROH_, description information on its OCC in response to receiving the ROH_, discovery signalling, the UE 1301 receives ROH_, description information broadcasted on OCC through VLC from the ROH 1302, and finally forwards the ROH information regarding the ROH 1302 to the eNB 1303 on LTE carrier.

The third method of discovering available ROHs is by Manual Settings. In this third method of discovering available ROH, Home users may manually provide the information of the HeNB for the ROH to find the HeNB, and/or the home users may manually provide the information of ROHs for the HeNB to control these ROHs.

In addition, in other embodiments, ROHs may advertise itself to the HeNB (if there exists any HeNB), for example, when the ROH is added into the house. There are proposed three methods of discovering the eNB described below.

The first method of discovering the eNB is by using power line communication (PLC). In this first method of discovering the eNB, the ROH may advertise a message including ROH_, description information to the HeNB. The ROH_, description message may include the ROH information (e.g., IP address) for the HeNB to control the ROH(s). The Simple Service Discovery Protocol (SSDP) may be used to discover HeNB.

The second method of discovering the eNB is UE-assist discovering the HeNB. The ROH may broadcast ROH_, description information (e.g., by visible light). Then, UEs may forward the received ROH_, description information to the HeNB.

The third method of discovering the eNB is Manual Settings. Home users may manually provide the information of the HeNB for the ROH to find the HeNB, and/or the home users may manually provide the information of ROHs for the HeNB to control these ROHs.

After discovering the HeNB and/or ROH(s), the HeNB may control and/or coordinate the ROH(s) to transmit some reference signalling (e.g., through visible light). The reference signalling may be used for UE measurement. The reference signalling may be used for synchronization.

In the procedure S172, a communication network (such as the eNodeB) configures the ROH(s) to the UE. In this step S172, the communication network may send a message to add (or configure) one or more OCCs to a UE. The network (e.g., HeNB) may determine to configure a ROH to provide a SCC for a UE based on some criteria (e.g., the amount (buffer status) of DL and/or UL traffic for the UE, the location of the ROH, the location of the UE, the measurement reports about the channel quality of the ROH, and so like). The measurement reports about the channel quality of the ROH feedback from the UE to the HeNB can be periodic or aperiodic. In another embodiments, the UE may send a message to the HeNB to request for adding the ROH. For example, the ROH may be selected by the user manually. The communication network (e.g., HeNB) may send a message (e.g., RRCConnectionReconfiguration message) to add the ROH(s) to the UE. This message may include the system information of the ROH, such as carrier frequency, bandwidth, cell identity, and so forth.

For example, in the procedure S173, referring to both FIG. 16 and FIG. 17, when a UE 163-7 enters a room which is equipped with the ROH device 163-2, the HeNB 163-1 can firstly determine the location of the UE 163-7, then determine that the UE 163-7 is closed to the location of the ROH device 163-2, and finally determine to configure the ROH device 163-2 to the UE 163-7. The same configuration principle can be applied based on other criteria.

In the procedure S173, the UE performs measurements. In this step S173, UE may measure and report the channel qualities for OCC(s). For example, a UE may measure channel quality for each of OCC(s), and report the measured channel quality to the HeNB or the eNB. The ROH(s) may send some reference signalling (e.g., common reference signal (CRS), UE-specific reference signal, DMRS, pilots, and so like.). The UE may measure the signal strength (e.g., reference signal received power (RSRP), reference signal received quality (RSRQ), and so forth) of ROH(s), and report the measurement results to the communication network (e.g., HeNB). The measurement results may be reported periodically or when a certain event is triggered. The measurement report may include the signal strength (e.g., RSRP, RSRQ) measured on OCC(s) from the ROH(s).

In the procedure S174, the communication network (such as the eNodeB) activates the ROH(s) for the UE. In this optional step S174, the communication network may determine to activate the configured OCC(s). Activation/deactivation mechanism of SCells may be supported to save UE battery consumption. The communication network may activate and/or deactivate the SCell(s) by sending the Activation/Deactivation MAC control element. When receiving an Activation/Deactivation MAC control element which is configured to activate the SCell, the UE may activate the SCell including: sounding reference signal (SRS) transmissions on the SCell; channel state information (CSI), such as channel quality indictor/pre-coding matrix indicator/ranking indicator/ Precoding Type Indicator (CQI/PMI/RI/PTI), reporting for the SCell; PDCCH monitoring for the SCell; a start or a restart of the sCellDeactivationTimer associated with the SCell. For example, the sCellDeactivationTimer associated with the SCell can be 320, ms.

If the UE receives an Activation/Deactivation MAC control element associated with the SCell; or the associated sCellDeactivationTimer expires, the UE may deactivate the SCell; stop the sCellDeactivationTimer associated with the SCell; flush all HARQ buffers associated with the SCell. Here, the Activation/Deactivation MAC control element associated with the SCell may be a MAC message.

If the SCell is deactivated, the UE may not to transmit SRS for the SCell; not to report channel state information (e.g., CQI/PMFRI/PTI) for the SCell; not to transmit on UL-SCH for the SCell; not to monitor the PDCCH for the SCell.

In the procedure S 175, the communication network (such as the eNodeB) deactivates/de-configures the ROH(s) for the UE. The communication network (e.g., HeNB) may determine to deactivate or de-configure a ROH for a UE based on some criteria (e.g., the amount (buffer status) of DL traffic for the UE, the location of the ROH, the location of the UE, the measurement reports about the channel quality of the ROH). The HeNB may send the Activation/Deactivation MAC control element to deactivate the OCC(s), and/or send a message (e.g., RRCConnectionReconfiguration message) to de-configure the OCC(s) for the UE.

Figure 20:
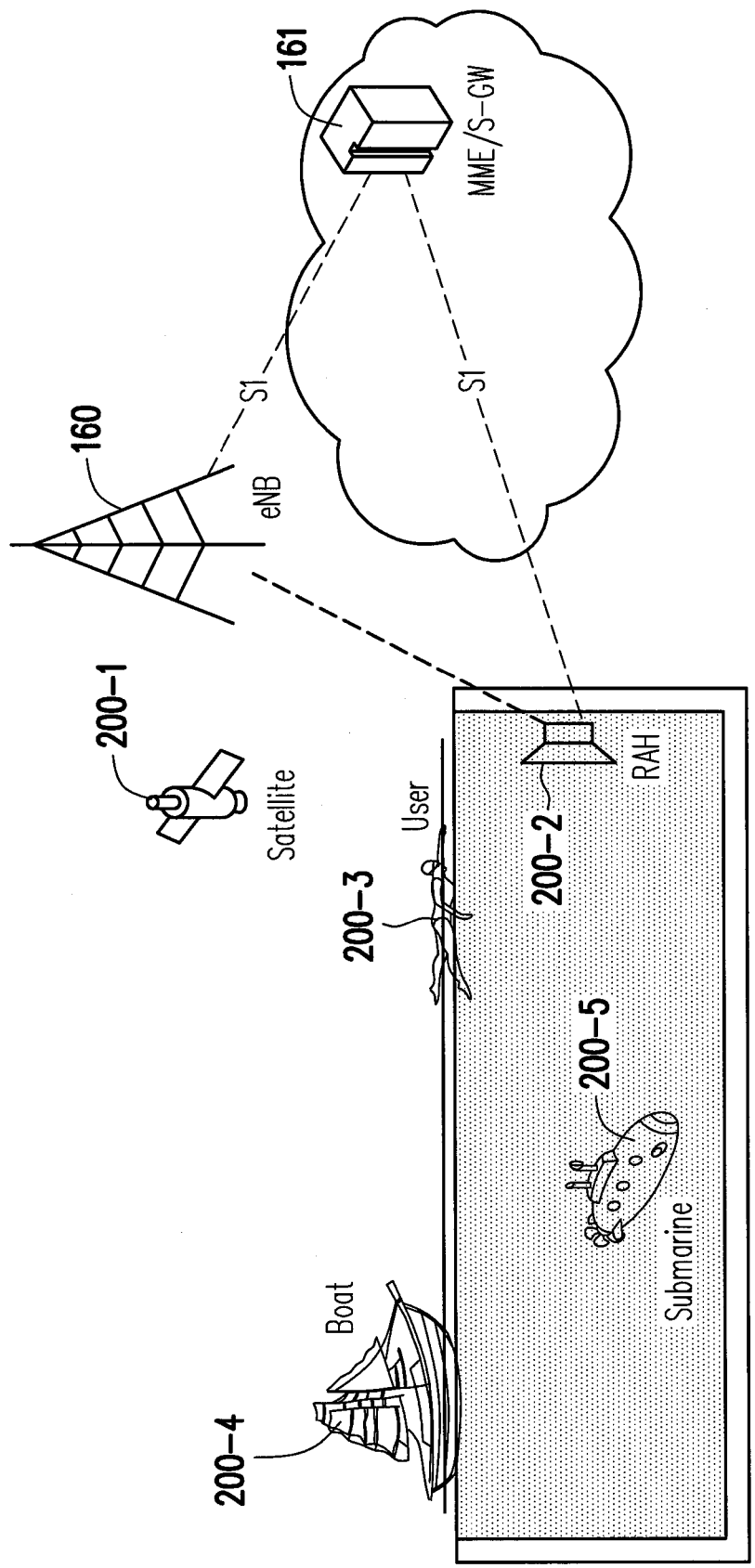
FIG. 20 is a schematic diagram illustrating a communication system based on aggregation of radio component carrier(s) and acoustic component carrier(s) according to a second exemplary embodiment.

FIG. 20 is a schematic diagram illustrating a communication system based on aggregation of radio component carrier(s) and acoustic component carrier(s) according to a second exemplary embodiment.

In this second exemplary embodiment, a RAH which provides at least an Acoustic Component Carrier (e.g., by using sonar) is deployed. There may be an eNB (or HeNB or satellite) providing at least a LTE carrier. The RAH may be controlled by an eNB or a gateway by using wireless or wired-line communication. This second exemplary embodiment can be used in health-care application. Referring to FIG. 20, in the communication system, an eNB 160 is connected to a MME/S-GW 161 through the S1, interface, an remote acoustic head (RAH) device 200-2 deployed under water is also connected to a MME/S-GW 161 through the S1, interface, and the eNB 160 may be connected to the RAH device 200-2 (by wired or wireless communication link) A satellite 200-1 is connected with the MME/S-GW 161 by wireless communication link. In the second exemplary embodiment, the RAH device 200-2 may be controlled by the eNB 160 or a gateway device (such as the MME/S-GW 161) by using wireless communication link or wired-line communication. The eNB 160 and the RAH device 200-2 may be in different locations.

Referring to FIG. 20, a user 200-3, equipped with corresponding component carrier transmitting/receiving means, may communication with the eNB 160 on RCC(s) (e.g., LTE carrier) of the eNB 160, or communicate with the satellite 200-1 on RCC(s) of the satellite 200-1, or communication with the RAH device 200-2 on ACC(s) of the RAH device 200-2. Similarly, a boat 200-4, equipped with corresponding component carrier transmitting/receiving means, may communication with the eNB 160 on RCC(s) of the eNB 160, or communicate with the satellite 200-1 on RCC(s) of the satellite 200-1, or communication with the RAH device 200-2 on ACC(s) of the RAH device 200-2. A submarine 200-5, equipped with corresponding component carrier transmitting/receiving means, may communication with the RAH device 200-2 on ACC(s) of the RAH device 200-2.

It is noted that the communication between the RAH device 200-2 and the user 200-3 may be bidirectional or unidirectional (in a embodiment, only the RAH device 200-2 transmits information on the ACC(s) to the user 200-3, or only the user 200-3 transmits information on the ACC(s) to the RAH device 200-2). The same operation principle can be applied to the communication between the RAH device 200-2 and the boat 200-4, and the communication between the RAH device 200-2 and the submarine 200-5. Also, the eNB 160 has similar component elements and similar functionality as the base station 50. The component carrier transmitting/receiving means on the user 200-3, or the boat 200-4 or the submarine 200-5 can have similar component elements and similar functionality as the wireless communication device 55.

Figure 21:
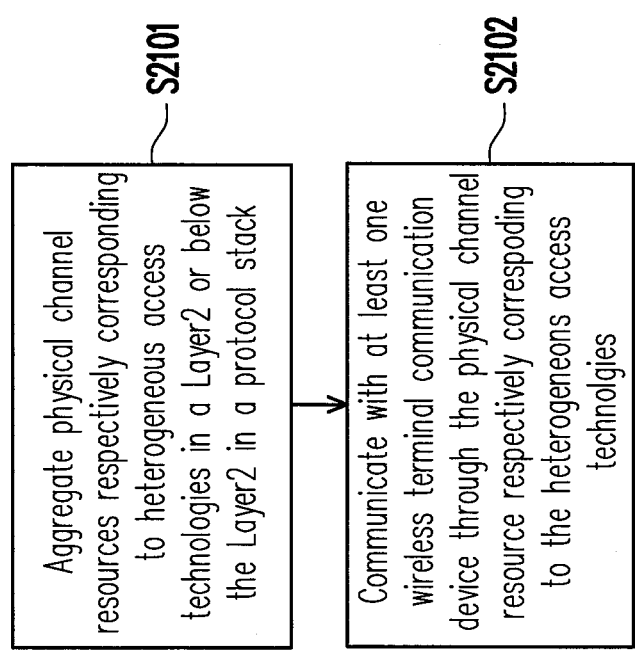
FIG. 21 is a flowchart illustrating a communication method involved with carrier aggregation with heterogeneous component carriers according to an embodiment of the disclosure.

FIG. 21 is a flowchart illustrating a communication method involved with carrier aggregation with heterogeneous component carriers according to an embodiment of the disclosure. Referring to both FIG. 5A and FIG. 21, the proposed communication method for aggregation with heterogeneous component carriers is adapted to a wireless communication station, where the wireless communication station may be a base station, a Node-B, an eNodeB, a base transceiver system, a remote head device, an access point, a home base station, a femto-cell base station, a relay station, a scatterer, a repeater, an intermediate node, an intermediary, or a satellite-based communication base station. According to the present embodiment, the wireless communication station is, for example, a base station 50 and the proposed method includes following procedures: the communication protocol unit 51 of the base station 50 aggregates physical channel resources respectively corresponding to heterogeneous access technologies in a Layer 2 or below the Layer 2, in a protocol stack (step S2101); the communication protocol unit 51 communicates with at least one wireless terminal communication device (for example the wireless communication device 55, as shown in FIG. 5B) through the physical channel resources respectively corresponding to the heterogeneous access technologies (e.g., according to at least channel conditions of the physical channel resources (step S2102)).

In the present embodiment, the step of aggregating the physical channel resources respectively corresponding to the heterogeneous access technologies in the Layer 2, or below the Layer 2, in the protocol stack includes the communication protocol unit 51 assigns at least one HARQ entity for each of configured heterogeneous component carriers. The physical channel resources respectively corresponding to heterogeneous access technologies are heterogeneous component carriers.

Figure 22:
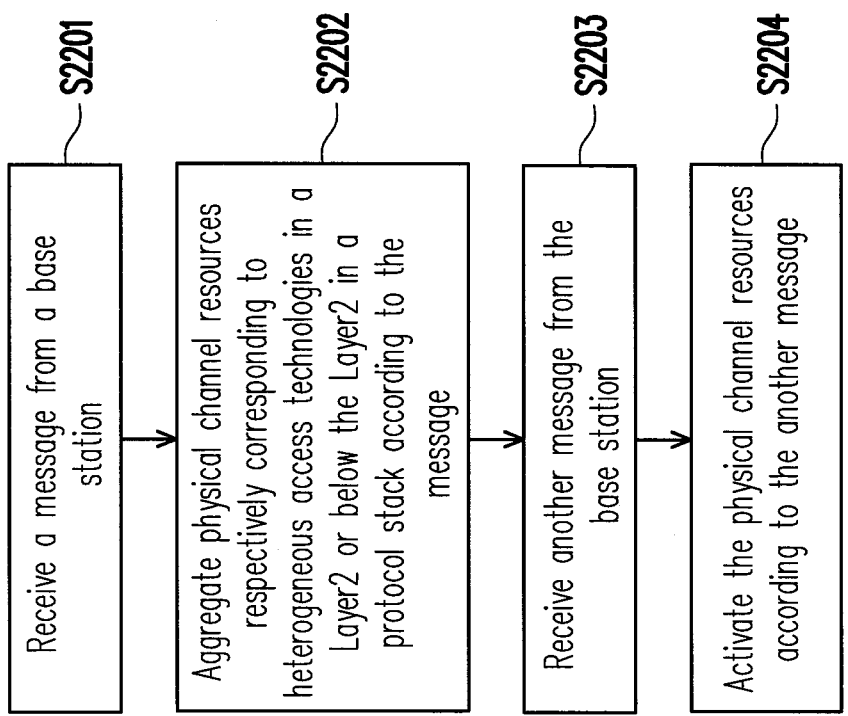
FIG. 22 is a flowchart illustrating another communication method involved with carrier aggregation with heterogeneous component carriers according to an embodiment of the disclosure.

FIG. 22 is a flowchart illustrating another communication method involved with carrier aggregation with heterogeneous component carriers according to an embodiment of the disclosure. Referring to both FIG. 5B and FIG. 22, the proposed communication method for aggregation with heterogeneous component carriers is adapted to a UE, and includes following procedures: the communication protocol unit 56 of the wireless communication device 55 receives a message from a base station (for example the base station 50, as shown in FIG. 5A) (step S2201); the communication protocol unit 56 aggregates physical channel resources respectively corresponding to heterogeneous access technologies in a Layer 2, or below the Layer 2, in a protocol stack according to the message (step S2202); the communication protocol unit 56 receives another message from the base station (step S2203); the communication protocol unit 56 activates the physical channel resources according to the another message (step S2204). Here, activating the physical channel resources by the communication protocol unit 56 may refer to transmitting uplink data, transmitting uplink message or receiving downlink data or receiving downlink message over activated physical channel resources. For example, activating the physical channel resources may include: sounding reference signal (SRS) transmissions on the physical channel resources, or CSI (e.g., CQI/PMI/RI/PTI) reporting for the physical channel resources, or PDCCH monitoring for the physical channel resources, or a start or a restart of the sCellDeactivationTimer associated with the physical channel resources. The physical channel resources respectively corresponding to heterogeneous access technologies are heterogeneous component carriers.

In summary, according to the exemplary embodiments of the disclosure, communication methods for aggregation of heterogeneous component carriers are proposed along with communication devices and remote head devices and base stations using the same methods. In general, the exemplary embodiments provide a simple communication system or a simple protocol stack or communication methods to aggregate heterogeneous component carriers in the Layer 2, or below the Layer 2,, and effectively increase bandwidth of the wireless transmission. In addition, the proposed communication methods for aggregation of heterogeneous component carriers can be deployed with remote head devices.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A communication method for aggregation of heterogeneous component carriers, adapted for a wireless communication station, comprising:
    aggregating physical channel resources respectively corresponding to heterogeneous access technologies in a Layer 2 or below the Layer 2 in a protocol stack; and
    communicating with at least one wireless terminal communication device through the aggregated physical channel resources respectively corresponding to the heterogeneous access technologies, wherein the aggregated physical channel resources respectively corresponding to the heterogeneous access technologies are the heterogeneous component carriers, wherein the heterogeneous component carriers comprise at least a radio component carrier, and at least one of an optical component carrier, an acoustic component carrier and an infrared component carrier; and
    using at least the radio component carrier to communicate ACK/NACK information for data transmitted on the at least one of the optical component carrier, the acoustic component carrier and the infrared component carrier.

2. The communication method for aggregation of heterogeneous component carriers according to claim 1, wherein the Layer 2 comprises at least one of a Medium Access Control (MAC), a Radio Link Control (RLC) and a Packet Data Convergence Protocol (PDCP) sublayer.

3. The communication method for aggregation of heterogeneous component carriers according to claim 1, wherein the step of aggregating the physical channel resources respectively corresponding to the heterogeneous access technologies in the Layer 2 or below the Layer 2 in the protocol stack comprises:
    assigning at least one HARQ entity for each of configured heterogeneous component carriers for the at least one wireless terminal communication device.

4. The communication method for aggregation of heterogeneous component carriers according to claim 1, further comprises:
    configuring at least one component carrier to the at least one wireless terminal communication device.

5. The communication method for aggregation of heterogeneous component carriers according to claim 4, further comprises:
    transmitting reference signal corresponding to the at least one component carrier;
    receiving measurement information regarding channel quality of the at least one component carrier from the at least one wireless terminal communication device; and
    determining whether activating the at least one component carrier to the at least one wireless terminal communication device.

6. The communication method for aggregation of heterogeneous component carriers according to claim 4, wherein the step of configuring at least one component carrier to the at least one wireless terminal communication device further comprises:
    configuring the at least one wireless terminal communication device to aggregate at least two heterogeneous component carriers based on the at least capability of the wireless terminal communication device.

7. The communication method for aggregation of heterogeneous component carriers according to claim 1, further comprises:
    communicating with the at least one wireless terminal communication device in a first component carrier; and
    communicating with the at least one wireless terminal communication device in a second component carrier through a remote head device, wherein the remote head device is located at the same location as that of the wireless communication station.

8. The communication method for aggregation of heterogeneous component carriers according to claim 1, further comprises:
    communicating with the at least one wireless terminal communication device in a first component carrier; and
    communicating with the at least one wireless terminal communication device in a second component carrier through a remote head device, wherein the remote head device is located at different location as that of the wireless communication station.

9. The communication method for aggregation of heterogeneous component carriers according to claim 8, wherein before communicating with the at least one wireless terminal communication device in the second component carrier through the remote head device, the communication method for aggregation of the heterogeneous component carriers further comprises:

discovering the remote head device;
initializing the remote head device; and
activating the configured component carrier(s) of the remote head device.

10. The communication method for aggregation of heterogeneous component carriers according to claim 1, further comprises:
configuring one of the aggregated heterogeneous component carriers to be a primary component carrier; and
configuring the remaining component carrier(s) of the aggregated heterogeneous component carriers to be secondary component carrier(s).

11. The communication method for aggregation of heterogeneous component carriers according to claim 10, further comprise:
using the primary component carrier or one of the at least one secondary component carrier to transmit HARQ ACK/NACK information for uplink data transmitted by the at least one wireless terminal communication device on the at least one secondary component carrier.

12. The communication method for aggregation of heterogeneous component carriers according to claim 10, further comprise:
receiving HARQ ACK/NACK information, for downlink data transmitted on the at least one secondary component carrier, on the primary component carrier or one of the secondary component carrier(s).

13. A wireless communication station, comprising:
at least one physical communication unit, configured for communicating with at least one wireless terminal communication device through at least one physical channel resource; and
a communication protocol unit, connected to the at least one physical communication unit, configured for aggregating the physical channel resources respectively corresponding to heterogeneous access technologies in a Layer 2 or below the Layer 2 in a protocol stack, wherein the aggregated physical channel resources respectively corresponding to the heterogeneous access technologies are heterogeneous component carriers, wherein the heterogeneous component carriers comprise at least a radio component carrier, and at least one of an optical component carrier, an acoustic component carrier and an infrared component carrier; and
the radio component carrier is at least used to communicate ACK/NACK information for data transmitted on the at least one of the optical component carrier, the acoustic component carrier and the infrared component carrier.

14. The wireless communication station according to claim 13, wherein the Layer 2 comprises at least one of a Medium Access Control (MAC), a Radio Link Control (RLC) and a Packet Data Convergence Protocol (PDCP) sublayer.

15. The wireless communication station according to claim 13, wherein the communication protocol unit assigns at least one HARQ entity for each of configured heterogeneous component carriers for the at least one wireless terminal communication device.

16. The wireless communication station according to claim 13, wherein:
the communication protocol unit configures at least one component carrier to the at least one wireless terminal communication device.

17. The wireless communication station according to claim 16, wherein:
the communication protocol unit transmits reference signal corresponding to the at least one component carrier; and
the communication protocol unit receives measurement information regarding channel quality of the at least one component carrier from the at least one wireless terminal communication device; and
determining whether activating the at least one component carrier to the at least one wireless terminal communication device.

18. The wireless communication station according to claim 13, wherein:
the communication protocol unit communicates with the at least one wireless terminal communication device in a first component carrier; and
the communication protocol unit communicates with the at least one wireless terminal communication device in a second component carrier through a remote head device.

19. The wireless communication station according to claim 18, wherein before communicating with the at least one wireless terminal communication device in the second component carrier through the remote head device:
the communication protocol unit discovers the remote head device;
the communication protocol unit initializes the remote head device; and
the communication protocol unit activates the configured component carrier(s) of the remote head device.

20. The wireless communication station according to claim 13, wherein:
for each one of the at least one wireless terminal communication device, the communication protocol unit configures one of the aggregated heterogeneous component carriers to be a primary component carrier, and configures the remaining component carrier(s) of the aggregated heterogeneous component carriers to be secondary component carrier(s).

21. The wireless communication station according to claim 20, wherein:
the communication protocol unit uses the primary component carrier or one of the secondary component carrier(s) to transmit HARQ ACK/NACK information for uplink data transmitted by the at least one wireless terminal communication device on the at least one secondary component carrier.

22. The wireless communication station according to claim 13, wherein:
the wireless communication station is one of a base station, a Node-B, an eNodeB, a base transceiver system, a remote head device, an access point, a home base station, a femto-cell base station, a relay station, a scatterer, a repeater, an intermediate node, an intermediary, and a satellite-based communication base station.

23. A communication method for aggregation of heterogeneous component carriers, adapted for a communication device, comprising:
aggregating physical channel resources respectively corresponding to heterogeneous access technologies in a Layer 2 or below the Layer 2 in a protocol stack; and
communicating with at least one wireless communication station through the aggregated physical channel resources respectively corresponding to the heterogeneous access technologies, wherein the aggregated physical channel resources respectively corresponding to the heterogeneous access technologies are heterogeneous component carriers, wherein the heterogeneous component carriers comprise at least a radio component carrier, and at least one of an optical component carrier, an acoustic component carrier and an infrared component carrier; and using at least the radio component carrier to communicate ACK/NACK information for data transmitted on the at least one of the optical component carrier, the acoustic component carrier and the infrared component carrier.

24. The communication method for aggregation of heterogeneous component carriers according to claim 23, wherein the Layer 2 comprises at least one of a Medium Access Control (MAC), a Radio Link Control (RLC) and a Packet Data Convergence Protocol (PDCP) sublayer.

25. The communication method for aggregation of heterogeneous component carriers to claim 23, wherein the step of aggregating physical channel resources is based on at least one message received from the at least one wireless communication station.

26. The communication method for aggregation of heterogeneous component carriers to claim 23, wherein the step of aggregating the physical channel resources respectively corresponding to the heterogeneous access technologies in the Layer 2 or below the Layer 2 in the protocol stack comprises:
  assigning at least one HARQ entity for each of configured heterogeneous component carriers.

27. The communication method for aggregation of heterogeneous component carriers to claim 23, further comprises:
  being configured at least one component carrier to the at least one wireless terminal communication device.

28. The communication method for aggregation of heterogeneous component carriers to claim 27, further comprises:
  measuring reference signal corresponding to the at least one component carrier from the wireless communication station;
  transmitting measurement information regarding channel quality of the at least one component carrier to the wireless communication station;
  receiving a message from the wireless communication station; and
  activating some of the at least one component carrier according to the message.

29. The communication method for aggregation of heterogeneous component carriers to claim 23, further comprising:
  communicating with the at least one wireless communication station in a first component carrier; and
  communicating with the at least one wireless communication station in a second component carrier through a remote head device.

30. The communication method for aggregation of heterogeneous component carriers to claim 23, further comprises:
  being configured one of the aggregated heterogeneous component carrier to be a primary component carrier; and
  being configured the remaining component carrier(s) of the aggregated heterogeneous component carrier to be secondary component carrier(s).

31. The communication method for aggregation of heterogeneous component carriers to claim 30, further comprising:
  using at least the primary component carrier to transmit HARQ ACK/NACK information for downlink data transmitted on the at least one secondary component carrier.

32. The communication method for aggregation of heterogeneous component carriers to claim 30, further comprising:
  using at least the primary component carrier to transmit HARQ ACK/NACK information for downlink data transmitted on the primary component carrier.

33. A communication device, comprising:
  at least one physical communication unit, configured for communicating with at least one wireless communication station through at least one physical channel resource; and
  a communication protocol unit, connected to the at least one physical communication unit, configured for aggregating physical channel resources respectively corresponding to heterogeneous access technologies in a Layer 2 or below the Layer 2 in a protocol stack, wherein the aggregated physical channel resources respectively corresponding to the heterogeneous access technologies are heterogeneous component carriers, wherein the heterogeneous component carriers comprise at a radio component carrier, and at least one of an optical component carrier, an acoustic component carrier and an infrared component carrier; and
  the radio component carrier is at least used to communicate ACK/NACK information for data transmitted on the at least one of the optical component carrier, the acoustic component carrier and the infrared component carrier.

34. The communication device according to claim 33, wherein the Layer 2 comprises at least one of a Medium Access Control (MAC), a Radio Link Control (RLC) and a Packet Data Convergence Protocol (PDCP) sublayer.

35. The communication device to claim 33, wherein the communication protocol unit assigns at least one HARQ entity for each of configured heterogeneous component carriers.

36. The communication device to claim 33, wherein the communication protocol unit is configured at least one component carrier to the communication device.

37. The communication device to claim 36, wherein:
  the communication protocol unit measures reference signal corresponding to the at least one component carrier from the at least one wireless communication station;
  the communication protocol unit transmits measurement information regarding channel quality of the at least one component carrier to the at least one wireless communication station;
  the communication protocol unit receives a message from the at least one wireless communication station; and
  the communication protocol unit activates some of the at least one component carrier according to the message.

38. The communication device to claim 33, wherein:
  the communication protocol unit communicates with the at least one wireless communication station in a first component carrier; and
  the communication protocol unit communicates with the at least one wireless communication station in a second component carrier through a remote head device.

39. The communication device to claim 33, wherein:
  the communication protocol unit is configured one of the aggregated heterogeneous component carrier to be a primary component carrier; and
  the communication protocol unit is configured the remaining component carrier(s) of the aggregated heterogeneous component carrier to be secondary component carrier(s).

40. The communication device to claim 38, wherein the communication protocol unit uses at least the primary component carrier to transmit HARQ ACK/NACK information for downlink data transmitted on the at least one secondary component carrier.

41. The communication device to claim 38, wherein the communication protocol unit uses at least the primary component carrier to transmit HARQ ACK/NACK information for downlink data transmitted on the primary component carrier.

* * * * *